(12) United States Patent
Villagran

(10) Patent No.: US 6,808,734 B2
(45) Date of Patent: Oct. 26, 2004

(54) POTATO DOUGH

(75) Inventor: Maria Dolores Martinez-Serna Villagran, Mason, OH (US)

(73) Assignee: The Procter & Gamble Co., Cincinnati, OH (US)

(*) Notice: Subject to any disclaimer, the term of this patent is extended or adjusted under 35 U.S.C. 154(b) by 434 days.

(21) Appl. No.: 09/906,973

(22) Filed: Jul. 17, 2001

(65) Prior Publication Data

US 2002/0155207 A1 Oct. 24, 2002

Related U.S. Application Data

(63) Continuation-in-part of application No. 09/553,643, filed on Apr. 20, 2000.
(60) Provisional application No. 60/220,314, filed on Jul. 24, 2000, and provisional application No. 60/131,047, filed on Apr. 26, 1999.

(51) Int. Cl.$^7$ .............................................. A23L 1/216
(52) U.S. Cl. ..................... 426/550; 426/637; 426/808
(58) Field of Search ................................ 426/637, 808, 426/457, 464, 550

(56) References Cited

U.S. PATENT DOCUMENTS

| | | |
|---|---|---|
| 2,469,995 A | 5/1949 | Schaul |
| 2,490,431 A | 12/1949 | Greene et al. |
| 2,759,832 A | 8/1956 | Cording, Jr. et al. |
| 2,780,552 A | 2/1957 | Willard, Jr. et al. |
| 2,787,553 A | 4/1957 | Cording, Jr. et al. |
| 3,031,314 A | 4/1962 | Hendel et al. |
| 3,067,042 A | 12/1962 | Pader |
| 3,085,020 A | 4/1963 | Backinger et al. |
| 3,260,607 A | 7/1966 | Asselbergs et al. |
| 3,282,704 A | 11/1966 | Fritzberg et al. |
| 3,355,304 A | 11/1967 | Barnes et al. |
| 3,407,080 A | 10/1968 | Rainwater et al. |
| 3,495,994 A | 2/1970 | Kwiat et al. |
| 3,501,315 A | 3/1970 | Slakis et al. |
| 3,574,643 A | 4/1971 | Lewis |
| 3,594,187 A | 7/1971 | Liepa |
| 3,597,227 A | 8/1971 | Murray et al. |
| 3,619,211 A | 11/1971 | Chang et al. |
| 3,626,466 A | 12/1971 | Liepa |
| 3,634,105 A | 1/1972 | Beck et al. |
| 3,666,494 A | 5/1972 | Bentz et al. |
| 3,767,427 A | 10/1973 | Chang et al. |
| 3,772,039 A | 11/1973 | Guadagni et al. |
| 3,800,050 A | 3/1974 | Popel |
| 3,814,818 A | 6/1974 | Chang et al. |
| 3,829,582 A | 8/1974 | Guadagni et al. |
| 3,830,949 A | 8/1974 | Shatila |
| 3,857,982 A | 12/1974 | Sevenants |
| 3,886,291 A | 5/1975 | Willard |
| 3,917,866 A | 11/1975 | Purves |
| 3,968,260 A | 7/1976 | Shatila et al. |
| 3,968,265 A | 7/1976 | Shatila et al. |
| 3,969,183 A | 7/1976 | Redd |

(List continued on next page.)

FOREIGN PATENT DOCUMENTS

| | | |
|---|---|---|
| AU | 486136 | 8/1977 |
| CA | 871648 | 5/1971 |
| EP | 0 320 057 | 6/1989 |
| EP | 0 418 955 | 9/1990 |
| EP | 0 418 955 B1 | 4/1994 |
| GB | 457088 | 11/1936 |
| GB | 566856 | 2/1944 |
| GB | 608996 | 9/1948 |
| GB | 1067793 | 4/1965 |
| GB | 1194421 | 5/1967 |
| GB | 1239946 | 11/1967 |
| GB | 1306384 | 5/1969 |
| GB | 1176897 | 1/1970 |
| GB | 1232497 | 5/1971 |
| GB | 1420505 | 5/1973 |
| WO | WO 91/15964 | 10/1991 |
| WO | WO 93/00823 | 1/1993 |
| WO | WO 94/23591 | 10/1994 |
| WO | WO 95/05090 | 2/1995 |
| WO | WO 96/01572 | 1/1996 |
| WO | WO 97/25880 | 7/1997 |
| WO | WO 98/00036 | 1/1998 |
| WO | WO 98/00037 | 1/1998 |
| WO | WO 99/03362 | 1/1999 |
| WO | WO 99/20112 | 4/1999 |
| WO | WO 99/33357 | 7/1999 |
| WO | WO 00/54609 | 9/2000 |
| WO | WO 00/64280 | 11/2000 |
| WO | WO 01/32033 A1 | 5/2001 |

OTHER PUBLICATIONS

US 6,294,208, 9/2001, Neel (withdrawn)

Swern, D.; "Bailey's Industrial Oil and Fat Products"; $4^{th}$ Edition, vol. 1, 1979, pp. 382–385 and 352–355.

Riha, William E., III, et al.—Formation of Flavors During Extrusion Cooking; Food Rev. Int., 12(3), 351–373 (1996) Marcel Dekker, Inc., New Brunswick, New Jersey, USA.

Villota, Ricardo, et al.—Chapter 23 –Flavoring In Extrusion; Thermally Generated Flavors—American Chemical Society Washington, D.C., 1994, pp. 280–295.

(List continued on next page.)

Primary Examiner—Arthur L. Corbin
(74) Attorney, Agent, or Firm—Melody A. Jones

(57) ABSTRACT

Disclosed is a potato dough and a method for making the same. The potato dough can be used to produce food products such as mashed potatoes, potato patties, potato pancakes, and potato snacks. The potato dough can also be used to form dehydrated potato products such as flakes, flanules, granules, agglomerates, sheets, pieces, bits, flour, and particulates. The dehydrated potato products are suitable for use in a wide variety of food products, such as mashed potatoes, potato patties, potato pancakes, potato snacks, breads, gravies, and sauces. The food products made from the dough and/or from the dehydrated products produced therefrom have improved potato flavor and improved texture. Especially preferred is an improved fabricated chip.

18 Claims, 9 Drawing Sheets

U.S. PATENT DOCUMENTS

| | | |
|---|---|---|
| 3,987,210 A | 10/1976 | Cremer |
| 3,997,684 A | 12/1976 | Willard |
| 3,998,975 A | 12/1976 | Liepa |
| 4,073,952 A | 2/1978 | Standing et al. |
| 4,107,345 A | 8/1978 | MacDonald et al. |
| 4,110,478 A | 8/1978 | Ooraikul |
| 4,156,032 A | 5/1979 | Kluge et al. |
| 4,198,437 A | 4/1980 | Citti et al. |
| 4,219,575 A | 8/1980 | Saunders et al. |
| 4,241,094 A | 12/1980 | O'Neil et al. |
| 4,263,332 A | 4/1981 | Withycombe et al. |
| 4,361,593 A | 11/1982 | Brooks et al. |
| 4,419,375 A | 12/1983 | Willard et al. |
| RE31,982 E | 9/1985 | Beck et al. |
| RE31,983 E | 9/1985 | Beck et al. |
| 4,560,569 A | 12/1985 | Ivers |
| 4,623,548 A | 11/1986 | Willard |
| 4,623,550 A | 11/1986 | Willard |
| 4,645,679 A | 2/1987 | Lee, III et al. |
| 4,668,519 A | 5/1987 | Dartey et al. |
| 4,678,672 A | 7/1987 | Dartey et al. |
| 4,698,230 A | 10/1987 | Willard |
| 4,769,253 A | 9/1988 | Willard |
| 4,770,891 A | 9/1988 | Willard |
| 4,770,893 A | 9/1988 | Kluge et al. |
| 4,781,937 A | 11/1988 | Knowles et al. |
| 4,834,996 A | 5/1989 | Fazzolare et al. |
| 4,873,093 A | 10/1989 | Fazzolare et al. |
| 4,876,102 A | 10/1989 | Feeney et al. |
| 4,931,303 A | 6/1990 | Holm et al. |
| 4,946,704 A | 8/1990 | De Wit |
| 4,970,084 A | 11/1990 | Pirrotta et al. |
| 4,973,481 A | 11/1990 | Hunt et al. |
| 4,985,262 A | 1/1991 | Camire et al. |
| 4,994,295 A | 2/1991 | Holm et al. |
| 5,045,335 A | 9/1991 | De Rooij et al. |
| 5,063,072 A | 11/1991 | Gillmore et al. |
| 5,085,884 A | 2/1992 | Young et al. |
| 5,093,146 A | 3/1992 | Calandro et al. |
| 5,104,673 A | 4/1992 | Fazzolare et al. |
| 5,110,613 A | 5/1992 | Brown et al. |
| 5,171,600 A | 12/1992 | Young et al. |
| 5,188,859 A | 2/1993 | Lodge et al. |
| 5,292,542 A | 3/1994 | Beck et al. |
| 5,320,858 A | 6/1994 | Fazzolare et al. |
| 5,340,598 A | 8/1994 | Hay, Jr. et al. |
| 5,366,749 A | 11/1994 | Frazee et al. |
| 5,405,625 A | 4/1995 | Biggs |
| 5,426,248 A | 6/1995 | Sarama et al. |
| 5,429,834 A | 7/1995 | Addesso et al. |
| 5,433,961 A | 7/1995 | Lanner et al. |
| 5,451,423 A | 9/1995 | Noel |
| 5,458,910 A | 10/1995 | Gruetzmacher et al. |
| 5,464,642 A | 11/1995 | Villagran et al. |
| 5,464,643 A | 11/1995 | Lodge |
| 5,500,240 A | 3/1996 | Addesso et al. |
| 5,514,387 A | 5/1996 | Zimmerman et al. |
| 5,514,404 A | 5/1996 | Zimmerman et al. |
| 5,554,405 A | 9/1996 | Fazzolare et al. |
| 5,624,697 A | 4/1997 | Lin et al. |
| 5,690,982 A | 11/1997 | Fazzolare et al. |
| 5,695,804 A | 12/1997 | Hnat et al. |
| 5,747,092 A | 5/1998 | Carey et al. |
| 5,922,386 A | 7/1999 | Reed et al. |
| 5,925,396 A | 7/1999 | Reed et al. |
| 5,928,700 A | 7/1999 | Zimmerman et al. |
| 6,022,574 A | 2/2000 | Lanner et al. |
| 6,066,353 A | 5/2000 | Villagran et al. |
| 6,177,116 B1 | 1/2001 | Villagran et al. |
| 6,287,622 B1 | 9/2001 | Villagran et al. |

OTHER PUBLICATIONS

Shahidi, Fereidoon, et al.—Flavor Generation During Extrusion Cooking; Process–Induced Chemical Changes in Food, 1998, Plenum Press, New York, pp. 297–306.

Lane, Richard P.—Cereal Foods World/Page; Formulation Variables Affecting the Flavor of Extruded Snacks and Crackers, 1983 American Association of Cereal Chemists, Inc., pp. 181–183.

Bredie, W.L.P., et al.—Journal of Cereal Science; Aroma Characteristics of Extruded Wheat Flour and Wheat Starch Containing Added Cysteine and Reducing Sugars—1997 American Press Limited, pp. 57–63.

Hwang, Chin–Fa, et al.—Effect of Cysteine Addition on the Volatile Compounds Released at the Die During Twin–Screw Extrusion of Wheat Flour; 1997 Academic Press Limited, LWT 30 (1997) No. 4, pp. 411–416.

Parliament, Thomas H., et al.—Chapter 26 –Ammonium Bicarbonate and Pyruvaldehyde as Flavor Precursors in Extruded Food Systems; Thermally Generated Flavors—American Chemical Society, Washington, D.C., 1994, pp. 328–333.

Part 2: Snack Food Formulation; Food Ingredients and Analysis.

Hwang, C.F.—IFT Annual Meeting: Book of Abstracts 1995, p. 192. Flavoring In Extrusion, An Overview. Abstract Nos. 68A–17, 68A–18, 68A–19 and 68A–20.

Mlotkiewicz, Jerzy A.—The Role of the Maillard Reaction in the Food Industry, Plenary Lectures, pp. 19–27.

Taylor, A.J.—Aroma Volatiles From the Extrusion Cooking of Model Systems Containing Proline and Ornithine; Flavour Science, Recent Developments—Thermally Generated Flavour, The Royal Society of Chemistry, Thomas Graham House, Science Park, Cambridge CB4 4WF, UK, pp. 221–224.

Abstract—RU 2045204, Method of Producing a Dry Breakfast Food by Extrusion Technology, Oct. 10, 1995, Patent Bulletin No. 28 (English Translation).

Abstract—RU 2045204, Method of Producing a Dry Breakfast Food by Extrusion Technology, Oct. 10, 1995, Patent Bulletin No. 28. (Russian).

Osnabrugge, Wim Van—How to Flavor Baked Goods and Snacks Effectively; Food Technology—Jan. 1989, pp. 74–82.

Riha, William Edwin, III—Effects of Added Reactive Precursors on Aroma Generation During Extrusion Cooking; UMI No. 9711119, UMI Company, Ann Arbor, Michigan, Copyright 1997, 177 pages.

Widdowson, McCance—"The Composition of Food—5$^{th}$ Ed." 1992, Royal Society of Chemistry, UK—XP002179384, pp. 224, 227, 228, 231, 232, 235.

Toshiyuki, Miyamoto, Patent Abstracts of Japan, Production of Dried Fish–Paste Product, Publication No. 60232079—Nov. 1985, 1 page.

Barrett, A.H., et al. Extrudate Cell Structure–Texture Relationships, vol. 57, No. 5, 1992–Journal of Food Science— pp. 1253–1257.

Smith, Ph.D., ORA Potatoes: Production, Storing, Processing, 1979–Second Edition, The AVI Publishing Company, Inc., pp. 703–705.

Talburt, M.S., William F., et al., Potato Processing, 1975–Third Edition, The AVI Publishing Company, Inc., pp. 467–495.

Whittenberger, R.T.– Changes in Specific Gravity, Starch Content, and Sloughing of Potatoes During Storage, vol. 28, 1951, The American Potato Journal, pp. 738–747.

Personius, Catherine J., Adhesion of Potato–Tuber Cells as Influenced by Temperature, Jan. 26, 1938, The American Potato Journal, pp. 513–524.

Abstract—RU 2077210 C1, Mashed Potato, Apr. 20, 1997 (Romaina).

| | |
|---|---|
| a. Cell Wall Definition. Cells that have well defined cell walls are considered whole. | 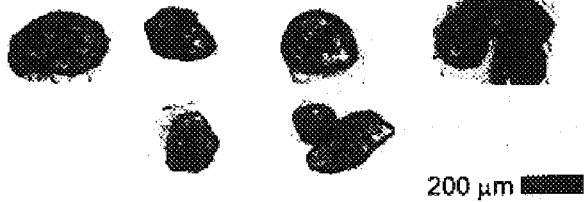 200 μm |
| b. Cell Color Dark colored cells are considered whole. | 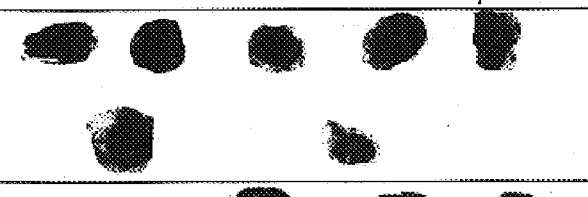 |
| c. Cell Internal Material Cells that have no obvious starch leakage are considered whole. |  |
| d. Cell Wall Area. If 90% of the cell wall is present, the cell is considered whole. | 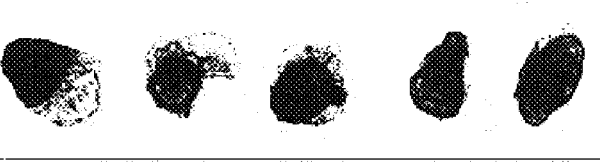 |
| e. Size Cell. Whole cells come in a variety of sizes due to swelling and expansion. If they meet criteria a-d in Fig.5, they are still counted as whole. | 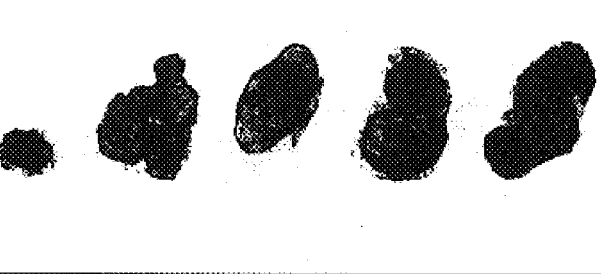 |
| f. Fractured Cells. Fractured cells as shown are counted as one whole cell. | 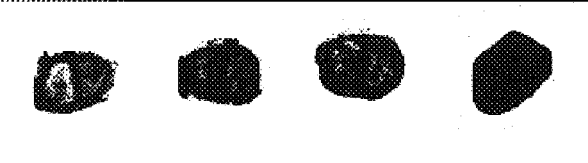 |
| g. Others. Additional examples of whole cells based on criteria a-f in Fig.5. If unsure, count as whole. | 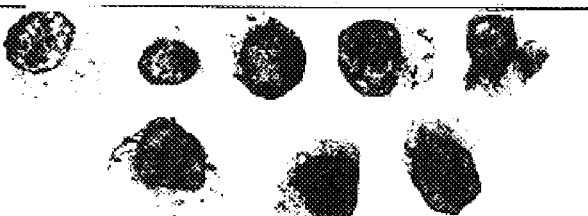 |

Fig. 5

POTATO DOUGH

CROSS REFERENCE TO RELATED APPLICATIONS

This application claims the benefit of priority to U.S. Provisional Application Ser. No. 60/220,314, filed Jul. 24, 2000; this application is also a continuation-in-part of U.S. application Ser. No. 09/553,643, filed Apr. 20, 2000, which claims the benefit of priority to U.S. Provisional Application Ser. No. 60/131,047, filed Apr. 26, 1999; all of which are herein incorporated by reference.

TECHNICAL FIELD

The present invention relates to a potato dough suitable for use in making food products having improved potato flavor and improved texture.

BACKGROUND OF THE INVENTION

The preparation of food products from a dough based on dehydrated potato products is well known. Snacks such as fabricated chips are among the most popular products which have been prepared from such doughs. The advantages of preparing such food products from a dough rather than from sliced, whole potatoes includes homogeneity or uniformity in the end food products and the ability to more closely control the separate steps involved in the preparation of the food products. When food products of this type are prepared from doughs based on dehydrated potato products and water, however, it has been found that the flavor of the resulting food product, though acceptable, is at least partially lacking in the characteristic potato flavor of corresponding products prepared from raw potatoes. For example, potato chips prepared by frying thin slices of raw potatoes generally have a more intense potato chip flavor than potato chips made by frying dough pieces which have been prepared by admixing dehydrated potato products and water.

The reason for these flavor differences between potato products prepared from fresh, raw potatoes and food products prepared from dehydrated potato products appears to be the degradative effect of the cooking and dehydration processes on the potato cells. Although the precise nature of this degradation is not known, it is theorized that a number of flavor precursors are either destroyed or significantly reduced in availability during processing. This leads to food products having less than desired potato flavor intensity.

Various efforts to improve the flavor of food products prepared with dehydrated potato products have focused on the addition of flavoring agents to the processed potatoes. Many of these flavoring agents have been produced from plant materials and various other natural ingredients. For example, U.S. Pat. No. 3,594,187, issued Jul. 20, 1971 to Liepa, discloses the addition of a flavor-enhancing agent selected from plants of the Cruciferae family (such as mustard, horseradish, rutabaga, or radish) to potato dough in order to increase the flavor thereof. U.S. Pat. No. 3,857,982, issued Dec. 31, 1974 to Sevenants, discloses the addition of a potato-chip flavor concentrate derived from fried potatoes to the dough. The process disclosed in Canadian patent No. 871,648, issued May 25, 1971 to Liepa, focuses on the addition of ascorbic acid to attain improved flavor. U.S. Pat. No. 4,698,230, issued Oct. 6, 1987 to Willard, discloses a potato flavor enhancing composition comprising a sugar component, an acidic component, a metallic flavor component, and a bitter flavor component.

Other flavoring efforts have focused on the addition of chemical flavoring agents, such as pyrazines. Examples of such chemical flavoring agents are described in U.S. Pat. No. 3,501,315 issued Mar. 17, 1970 to Slakis et al.; U.S. Pat. No. 3,619,211 issued Nov. 9, 1971 and U.S. Pat. No. 3,814,818 issued Jun. 4, 1974, both to Chang et al.; U.S. Pat. Nos. 3,772,039 and 3,829,582 to Guadagni et al; U.S. Pat. No. 3,666,494 issued May 30, 1972 to Bentz et al.; and U.S. Pat. No. 4,263,332 issued Apr. 21, 1981 to Withycombe et al.

Unfortunately, past efforts to restore natural potato flavor through the addition of such flavoring agents have generally provided less than optimal solutions. The addition of flavoring agents has often led to food products with "off" flavors uncharacteristic of natural potato. Furthermore, while the addition of such flavoring agents to food products requiring no further processing, such as mashed potatoes, may provide some flavor benefit, their use in intermediate products requiring further processing, such as to a potato mash or dough used to produce fabricated snack chips, can lead to volatilization and/or alteration of the flavoring agents in subsequent processing steps such as frying. This can lead to final food products having no improvement in flavor and/or an objectionable flavor unlike that of natural potato.

Because the addition of flavoring agents to compensate for the loss of potato flavor has not provided a wholly satisfactory solution, it would be desirable to provide dehydrated potato products that retain their natural potato flavor intensity during processing, and thus provide food products that more closely resemble those corresponding products prepared from fresh, raw, or cooked whole potatoes.

It would be especially desirable to provide fabricated chips from these dehydrated potato products.

During the processing of dehydrated potato products, the cellular structure of the potato is disrupted. This can cause snack food products made from the dehydrated potato products, such as fabricated chips, to have a much lower level of crispiness in comparison to corresponding products made from fresh, raw, or cooked whole potatoes. Prior efforts to increase the crispiness of snack food products made from dehydrated potato products have included the addition of fibrous cellulosic material to the snack food dough, as described in U.S. Pat. No. 4,876,102 issued Oct. 24, 1989 to Feeney et al. U.S. Pat. No. 4,219,575, issued Aug. 26, 1980 to Saunders et al., teaches the addition of modified food starch to potato-based dough in order to increase the crispiness of French fries made therefrom.

Unfortunately, past efforts to improve food product crispiness have not been wholly successful when applied to the production of fabricated chips, resulting in fabricated chips that have less than the desired level of crispiness.

Accordingly, it would be desirable to provide fabricated chips having not only increased potato flavor intensity, but also a level of crispiness closer to that of sliced potato chips.

SUMMARY OF THE INVENTION

The present invention provides a dough comprising dehydrated potato products. The dough is suitable for use in making fabricated chips having improved potato flavor and improved texture.

The dough of the present invention comprises:
 (a) from about 35% to about 85% starch-based flour, wherein said starch based flour comprises from about 25% to about 100% potato flakes comprising:
  (1) less than about 70% broken cells; and
  (2) an Amylose to Amylopectin ratio of from about 0.4 to about 4; and (b) from about 15% to about 50% added water;

In a preferred embodiment of the present invention, dough has a sheet strength of from about 80 gf to about 450 gf and a Tg of from about −5° C. to about 10° C.

DESCRIPTION OF THE DRAWINGS

FIG. 1 illustrates how glass transition temperature (Tg) is determined graphically for the finished fabricated chip. A Tg range of from about 80° C. to about 160° C. (Aw=0.3+0.003, @ $T_{30° C.}$) is typical of the finished snack chips of this invention, as described in the Analytical Methods section herein.

FIG. 2 illustrates how Glass Transition (Tg) of the Dough (30% ±1 moisture content) is determined graphically. A Tg range of from about −15° C. to about 18° C. is typical of doughs of this invention, as measured as described in the Analytical Methods section herein.

FIG. 3 illustrates a typical graph obtained with the Texture Analyzer for Initial Hardness (IH) of a finished snack chip, showing force (gf) vs. time (sec), to determine initial hardness as described in the Analytical Methods section herein.

FIG. 4 illustrates CE-IA electropherograms of soluble amylopectin from potato amylopectin (A) and potato amylose, recrystallized twice with thymol from potato starch (B). Standard concentrations 2 mg/ml.

FIG. 5. FIG. 5 sets forth criteria for determining whole cells.

FIG. 6 sets forth criteria for determining broken cells.

FIG. 7 sets forth additional criteria for counting broken cells.

FIG. 8 sets forth other criteria for cell counting.

FIG. 9 is an image of 100% Norchip potato flakes for demonstration of the whole and broken cell counting procedure.

DETAILED DESCRIPTION

A. Definitions

Figure 1:
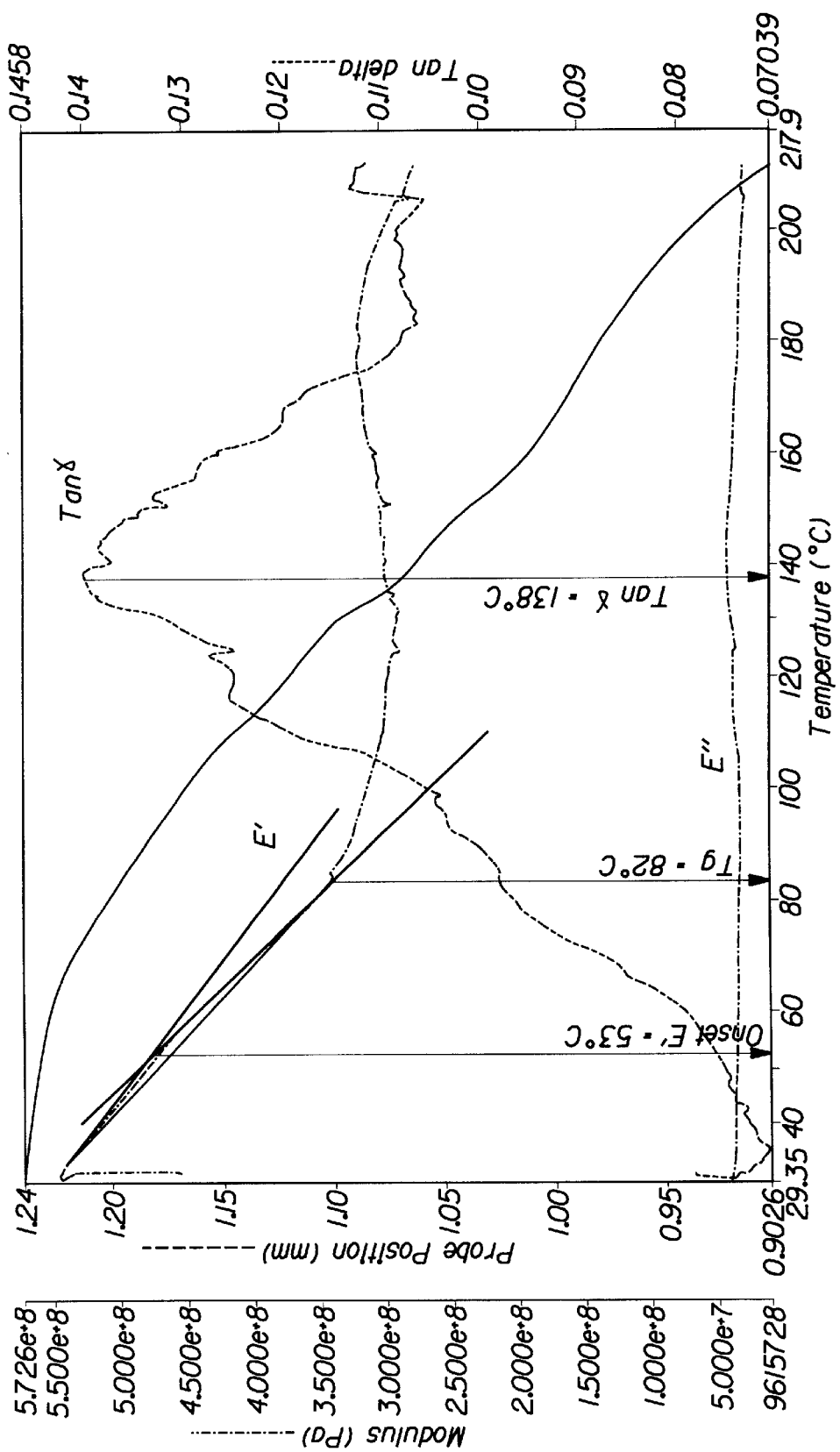
FIG. 1.

As used herein, "reduced cooking" refers to the degree of cooking required to only partially gelatinize starch and inactivate enzymes responsible for browning.

As used herein, the term "fabricated" refers to food products made from doughs that contain flour, meal, or starch derived from tubers, grains, legumes, cereals, or mixtures thereof.

As used herein, "native starch" refers to starch that has not be pre-treated or cooked in any way, and includes but is not limited to hybrid starches.

As used herein "cohesive dough" is a dough capable of being placed on a smooth surface and rolled or extruded to the desired final thickness or extruded through a die orifice without tearing or forming holes.

As used herein, "mashed potatoes" include those potato products made by mixing dehydrated potatoes with water as well as those made by mixing cooked potatoes.

As used herein, "dehydrated potato products" includes, but is not limited to, potato flakes, potato flanules, potato granules, potato agglomerates, any other dehydrated potato material, and mixtures thereof.

As used herein, intact sheets of flakes and sheet sections are included in the term "potato flakes."

As used herein, "food product" includes, but is not limited to, fabricated snack chips, mashed potatoes, French fries, and any other food comprising a dehydrated potato product.

As used herein "flanules" refers to dehydrated potato products described in U.S. patent application Ser. No. 09/175,138, Dough Compositions Made With Dehydrated Potato Flanules, filed Oct. 19, 1998 by Villagran et al., now U.S. Pat. No. 6,287,622, which patent is incorporated herein by reference. Flanules are dehydrated potato products with a functionality between flakes and granules (as defined by a WAI of from about 5.5 to about 7 and % free amylose of from about 9 to about 19 for flanules).

As used herein "sheetable dough" is a dough capable of being placed on a smooth surface and rolled to the desired final thickness without tearing or forming holes. Sheetable dough can also include dough that is capable of being formed into a sheet through an extrusion process.

As used herein, "starch" refers to a native or an unmodified carbohydrate polymer having repeating anhydroglucose units derived from materials such as, but not limited to, wheat, corn, tapioca, sago, rice, potato, oat, barley, and amaranth, and to modified starches including but not limited to hydrolyzed starches such as maltodextrins, high amylose corn maize, high amylopectin corn maize, pure amylose, chemically substituted starches, crosslinked starches, and mixtures thereof. "Starch" also includes dried potato products which are added into or back into the mash.

As used herein, "starch-based flour" refers to high polymeric carbohydrates composed of glucopyranose units, in either natural, dehydrated (e.g., flakes, granules, meal) or flour form. Starch-based flour can include, but is not limited to, potato flour, potato granules, potato flanules, potato flakes, corn flour, masa corn flour, corn grits, corn meal, rice flour, buckwheat flour, oat flour, bean flour, barley flour, tapioca, and mixtures thereof. For example, the starch-based flour can be derived from tubers, legumes, grain, or mixtures thereof.

As used herein, "modified starch" refers to starch that has been physically or chemically altered to improve its functional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof. (When calculating the level of modified starch according to the present invention, modified starch (e.g., gelatinized starch) that is inherent in dehydrated potato products and other starch-containing ingredients is not included; only the level of modified starch added over and above that contained in other dough ingredients is included in the term "modified starch.")

As used herein, the term "added water" refers to water which has been added to the dry dough ingredients. Water which is inherently present in the dry dough ingredients, such as in the case of the sources of flour and starches, is not included in the added water.

As used herein, the term "emulsifier" refers to an emulsifier which has been added to the dough ingredients. Emulsifiers which are inherently present in the dough ingredients, such as in the case of the potato flakes, are not included in the term emulsifier.

As used herein, "crispiness" and "crispness" are synonymous.

As used herein, "rapid viscosity unit" (RVU) is an arbitrary unit of viscosity measurement roughly corresponding to centipoise, as measured using the RVA analytical method herein. (12 RVU equal approximately 1 centiPoise)

As used herein, "Glass Transition Temperature" (Tg) for doughs of this invention is defined as the peak of tan delta, which is defined in the Analytical Methods section herein.

As used herein, "Glass Transition Temperature" (Tg) for fabricated chips is the inflection point of the drop of the storage modulus (E') when plotted as a function of temperature, as defined in the Analytical Methods Section herein.

Tan δ ("tan delta") is the ratio of the energy lost (E") to the energy stored (E') during the transition from a glassy state to a rubbery state, as described in the Analytical Methods section herein.

"Initial hardness" is the maximum force required to compress the snack as measured within the first six seconds of compression, as described in the Analytical Methods Section herein.

Optimum "Doneness" can be expressed as the optimum end point of cooking achieved by the desired initial hardness and Aw of the fabricated chips of the present invention.

Optimum "Crispiness" is defined as the optimum texture achieved by the desired initial hardness and color of the fabricated chips of the present invention.

"Water activity" (Aw) is the ratio from the vapor pressure of the material divided by the vapor pressure of the air at the same temperature.

"Amylose/Amylopectin Ratio" (Am/Ap) is the soluble amylose (Am) concentration in milligrams per 100 mg of flakes divided by the soluble amylopection (Ap) concentration in milligrams per 100 mg of flakes, as described in the Analytical Methods section herein.

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

Liquid non-digestible oils can also be used in the practice of the present invention. Liquid non-digestible oils have a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 21, 1993), liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred.

The preferred non-digestible fats are fatty materials having properties similar to triglycerides such as sucrose polyesters. OLEAN™, a preferred non-digestible fat, is made by The Procter and Gamble Company. These preferred non-digestible fat are described in Young; et al., U.S. Pat. No. 5,085,884, issued Feb. 4, 1992, and U.S. Pat. No. 5,422,131, issued Jun. 6, 1995 to Elsen et al.

All percentages are by weight unless otherwise specified.

B. Dehydrated Potato Products

1. Potatoes

Any commercially available potatoes, such as those used to prepare conventional potato flakes, flanules, or granules, can be used to prepare the dehydrated potato products of the present invention. Preferably, the dehydrated potato products are prepared from potatoes such as, but not limited, to Norchip, Norgold, Russet Burbank, Lady Russeta, Norkota, Sebago, Bentgie, Aurora, Saturna, Kinnebec, Idaho Russet, and Mentor.

Potatoes having less than about 5% reducing sugars (calculated on a dehydrated potato basis), preferably less than about 3%, and more preferably less than about 2%, are preferred. For example, potatoes having low levels of reducing sugars (i.e. <1.5%) are especially preferred for fried potato snacks because these potatoes effect lower browning rates during frying.

2. Reduced Cooking Procedure

The potatoes are subjected to a reduced cooking procedure to soften them for mashing. According to the reduced cooking procedure of the present invention, the potatoes are cooked for an amount of time sufficient to achieve partial starch gelatinization and partial inactivation of enzymatic and non-enzymatic browning enzymes, yet maintain the hardness of the potatoes at significantly higher levels as compared to conventional cooking processes.

The potatoes may be peeled, partially peeled, or unpeeled. The potatoes may be whole or may be sliced into pieces of any size before cooking. The reduced cooking procedure can be any thermal or other type of cooking process that softens the potatoes for mashing. For instance, the potatoes may be cooked by submersion in water or steam.

In conventional cooking processes, the potatoes are cooked until the hardness of the center of the potatoes drops from about 1000 grams force (gf) to about 40 gf. According to the present invention, however, the potatoes are cooked only long enough to achieve a center hardness of from about 65 gf to about 500 gf, preferably from about 80 gf to about 350, more preferably from about 90 gf to about 200 gf, and still more preferably from about 130 gf to about 150 gf.

The actual temperature and length of time the potatoes and/or potato pieces are cooked depends upon the size of the potatoes and/or potato pieces that are being cooked and the cooking method employed (i.e., steam pressure, boiling temperature). The cooking time is determined by measuring the hardness of the potatoes at the center with a Texture Analyzer (TA, Instruments, Corp., New Castle, Del.), as described in the Analytical Methods Section herein.

For example, potato slices having an average thickness of about ⅜ inch to about ½ inch are typically cooked with steam having a temperature of from about 200° F. (93° C.) to about 250° F. (121° C.) from about 12 to about 30 minutes, more particularly from about 14 to about 18 minutes, to achieve the desired hardness. Shoestring cut potatoes pieces are typically cooked with steam having a temperature of from about 200° F. (93° C.) to about 250° F. (121° C.) for about 7 to about 18 minutes, more particularly from about 9 to about 12 minutes, to achieve the desired hardness.

3. Mash Formation

Next, the cooked potatoes are comminuted to produce a wet mash. Commutation of the cooked potatoes may be accomplished by any suitable means, such as but not limited to ricing, mashing, shredding, or a combination thereof.

a. Addition of Optional Ingredients

Starch

Optionally but preferably, starch can be added to the wet mash in order to impart improved characteristics to the mash itself and/or to the products made therefrom. Preferably from about 0.5% to about 50%, more preferably from about 2% to about 30%, and still more preferably from about 4% to about 15% starch (on a dry mash basis) is mixed with the wet mash and uniformly distributed throughout.

As used herein, "starch" refers to a native or an unmodified carbohydrate polymer having repeating anhydroglucose units derived from materials such as, but not limited to, wheat, corn, tapioca, sago, rice, potato, oat, barley, and amaranth, and to modified starches including but not limited to hydrolyzed starches such as maltodextrins, high amylose corn maize, high amylopectin corn maize, pure amylose, chemically substituted starches, crosslinked starches, and mixtures thereof. "Starch" also includes dried potato products which are added into or back into the mash.

The benefits of starch addition to the mash include: (1) improved water distribution in the mash, (2) decreased adhesiveness of the mash to the drun, (3) increased productivity rate by increasing the surface porosity and solids content of the mash, thereby reducing the residence time for drying to achieve the desired moisture content of the dehydrated potato products, (4) increased cohesiveness of the freshly mashed potatoes, and (5) increased crispiness of fabricated chips, due to a decreased level of soluble Amylopectin (Ap).

The preferred starch is native (uncooked) starch having: (1) a smaller starch granule size than potato starch, (2) a water absorption index (WAI) lower than that of potato starch, such that the starch swells to a lesser degree than the potato starch during cooking, and/or (3) a percent of free amylose greater than that of potato starch at the same level of cook. Table 1 below compares potato starch to wheat, rice, and corn starch.

TABLE 1

Differences in functionality between potato starch and wheat, rice, and corn starch.

| Starch | Granule size (µm) | Shape | Gelatinization (° C.) | Water Absorption Index (WAI) | Swelling Power |
|---|---|---|---|---|---|
| Potato | 15–100 | oval | 56–66 | 8–12 | >1000 |
| Wheat | 2–35 | flat & eliptic | 52–63 | 3.5 | 21 |
| Rice | 3–8 | polygonal | 61–77.5 | 3 | 19 |
| Corn | 5–25 | polygonal | 62–72 | 4.5 | 24 |

Especially preferred for use herein is native (uncooked, unmodified) wheat starch. Without being limited by theory, it is believed that wheat starch indirectly prevents rupture of the potato cells by providing additional free amylose to the mash over and above that provided by the potato starch cooked under similar conditions. In particular, the wheat starch provides free amylose that would otherwise have to be provided by prolonged cooking of the potato starch. The increased free amylose content of the resulting dehydrated potato products produces cohesive doughs particularly suitable for use in the manufacture of fabricated potato snacks.

Staining microscopic studies have revealed that in the wheat starch granule the amylose tends to diffuse to the outer part of the starch granule and to the aqueous phase even before gelatinization is fully completed. This is a consequence of its lower swelling capacity. Shearing of the wheat starch pastes leads to a fragmentation of the outer layer of the granules. The changes occurring when the wheat starch pastes are sheared are minor compared to those observed in potato starch pastes, where shearing completely altered the microstructure. The potato starch granule disintegrates readily after gelatinization. It has been theorized that the disintegration is preceded by the collapse or cavitation of the swollen granule, causing nodes or weak points in the granular walls. It has also been theorized that the difference between wheat starch and potato starch is the amylose distribution in the starch granule. The wheat starch has the amylose located in the outer part of the granule, which enables the amylose to leach out after swelling, while the potato starch has the amylose located relatively closer to the inner portion of the granule.

Alternatively, starch can be added to potato mashes other than the mash of the present invention to produce mashes having properties superior to those of conventional potato mashes. For superior results, however, the mash of the present invention is preferred.

Emulsifier

If desired, emulsifier can optionally be added to the mash as a processing aid. Typically, from about 0.01% to about 3%, preferably from about 0.1% to about 0.5% emulsifier is added to the wet mash. The preferred emulsifier is a distilled monoglyceride and diglyceride of partially-hydrogenated soybean oil. Other emulsifiers suitable as processing aids, such as but not limited to lactylate esters, sorbitan esters, polyglycerol esters, and lecithins, can also be used.

Emulsifiers can provide various benefits. For example, emulsifiers can coat free starch, thus reducing stickiness and adhesiveness of the mash on the drier. Emulsifiers can also provide lubrication and thus reduce potato cell damage caused by excessive shear during processing.

Other Optional Ingredients

Other desired optional ingredients can also be added to the wet mash. For instance, various stabilizers and preservatives are usually employed to improve the stability and texture of the resulting dehydrated potato products. For example, sulfite can be added as dry sodium sulfite and/or sodium bisulfite to the wet mash to produce dehydrated products comprising from about 150 to about 200 parts per million (ppm) of sulfite. The sulfite protects the resulting dehydrated potato products from darkening during processing and subsequent storage. Antioxidants such as propyl gallate, BHA (2 and 3-tert-butyl-4-hydroxy-anisole), BHT (3,5-di-tert-butyl-4-hydroxytoluene), and natural antioxidants such as rosemary, thyme, marjoram, and sage, can be added in an amount to produce dehydrated potato products comprising up to about 10 ppm antioxidants to prevent oxidative deterioration. Citric acid can be added in a quantity sufficient to give about 200 ppm in the dehydrated potato product to prevent discoloration caused by the presence of iron ions. Ascorbic acid can also be added to compensate for the Vitamin C losses during processing.

b. Firmness of the Potato Mash

The firmness of the potato mash is an indirect measurement of the viscosity of the cooked and mashed potatoes. The firmness of the potato mash is affected not only by the potato variety, age, and storage conditions, but also by processing conditions and the materials added into the mash.

For example, potatoes subjected to reduced cooking in accordance with the present invention are relatively firm. The addition of starch to the relatively firm potatoes decreases the firmness of the potato mash. For instance, the addition of 10% native wheat starch to the potato mash can provide a reduction in firmness of the potato mash of about 50%. Accordingly, reduced potato mash firmness can be obtained without overcooking or unevenly cooking the potatoes.

The reduced cooking process of the present invention provides a potato mash having a firmness of from about 10,000 gf to about 20,000 gf (measured using a 35 mm compression disk). This mash can be used to produce products having improved characteristics. For instance, fabricated chips made from flakes made from this mash have an improved crispiness and a potato flavor more closely resembling that of chips made from sliced potatoes.

The combination of the reduced cooking of the present invention and the addition of starch, preferably native wheat starch, to the resultant mash provides a potato mash preferably having a firmness of from about 3,000 gf to about 18,000 gf, more preferably from about 5,000 gf to about 16,000 gf. This produces a final fabricated chip having an improved texture, as defined by the desired initial hardness and the desired crispiness value.

C. Wet Mash Products

After the mash is formed, it can be further dried and processed as described below to form dehydrated potato products. Alternatively, the wet mash can be used to produce products such as, but not limited to, mashed potatoes, potato patties, potato pancakes, and potato snacks such as extruded French fries, potato sticks, and snack chips.

For example, the wet potato mash can be used to produce extruded French fried potato products such as those described in U.S. Pat. No. 3,085,020, issued Apr. 9, 1963 to Backinger et al., which is herein incorporated by reference. Use of a mash rather than raw potatoes to produce such snacks provides fried potato products with essentially no color or texture variations. Furthermore, because the mash can be formed into a product of any desired shape and size, the final product is not dependent upon the shape and size of the raw potatoes. Such control and uniformity are not possible when raw potatoes are employed.

4. Drying the Mash to Form Dehydrated Potato Products

After forming the mash, the mash is dried to form dehydrated potato products. These dehydrated potato products can be in any form, such as but not limited to flakes, flanules, granules, agglomerates, sheets, pieces, bits, flour, or particulates.

Any suitable procedure, such as those known in the art, for producing such dehydrated potato products from a mash may be employed, and any suitable equipment may be used. For example, the mash can be dried to produce flakes according to known processes such as those described in U.S. Pat. No. 6,066,353, issued May 23, 2000 to Villagran, et al., as well as those processes described in U.S. Pat. No. 2,759,832 issued Aug. 19, 1956 to Cording et al., and U.S. Pat. No. 2,780,552 issued Feb. 5, 1957 to Willard et al, all of which are herein incorporated by reference. The mash can be dried to make flanules according to the process set forth in U.S. application Ser. No. 09/175,138, filed Oct. 19, 1998, now U.S. Pat. No. 6,287,622, which is herein incorporated by reference. Granules can be produced by processing the mash according to the process described in U.S. Pat. No. 3,917,866, issued Nov. 4, 1975 to Purves et al., or by other known processes such as that described in U.S. Pat. No. 2,490,431 issued Dec. 6, 1949 to Greene et al., all of which are herein incorporated by reference. Suitable dryers can be selected from those well known drying devices including but not limited to fluidized bed dryers, scraped wall heat exchangers, drum dryers, freeze-dryers, air lift dryers, and the like.

Preferred drying methods include those that reduce the amount of total thermal input. For example, freeze drying, drum drying, resonant or pulse flow drying, infrared drying, or a combination thereof is preferred when producing flakes; and air lift drying, fluidized bed drying, or a combination thereof is preferred when producing granules.

Although the dehydrated potato products herein will be primarily described in terms of flakes, it should be readily apparent to one skilled in the art that the potato mash of the present invention can be dehydrated to produce any desired dehydrated potato product that can be derived from a mash.

Drum drying, such as with drum dryers commonly used in the potato product industry, is the preferred method for drying the potato mash to form flakes. The preferred process utilizes a single drum drier wherein the wet potato mash is spread onto the drum in a thin sheet having a thickness of from about 0.005" to about 0.1", preferably from about 0.005" to about 0.05", more preferably about 0.01". Typically, when a drum dryer is used, the mash is fed to the top surface of the drum by a conveying means. Small diameter unheated rolls progressively apply fresh potato mash to portions already on the drum, thus building up a sheet, or layer, having a predetermined thickness. The peripheral speed of the small rolls is the same as that of the drum. After the layer of mash travels around a portion of the circumference of the drum, a doctor knife removes the dried sheet by peeling the dried sheet away from the drum. Typically, the drum dryer itself is heated to temperatures in a range of from about 250° F. (121° C.) to about 375° F. (191° C.), preferably from about 310° F. (154° C.) to about 350° F. (177° C.), and more preferably from about 320° F. (160° C.) to about 333° F. (167° C.) by pressurized steam contained within the drum at pressures of from about 70 psig to about 140 psig. For best results, the rotational speed of the dryer drum and the internal temperature thereof are suitably controlled so as to give a final product having a moisture content of from about 5% to about 14%, preferably from about 5% to about 12%. Typically, a rotational speed of from about 9 sec/rev to about 25 sec/rev., preferably about 11 sec/rev to about 20 sec/rev, is sufficient.

Once the wet mash is sheeted and dried, the resulting dried sheet of flakes can then be broken into smaller sections if desired. These smaller sections can be of any desired size. Any method of breaking the sheet that minimizes starch and potato cell damage, such as fracturing, grinding, breaking, cutting, or pulverizing, can be used. For example, the sheet can be comminuted with an Urschel Comitrol, manufactured by Urschel Laboratories, Inc. of Valparaiso, Ind., to break up the sheet. Alternatively, the sheet of flakes can be left intact. As used herein, both the intact sheet of flakes and smaller sheet sections are included in the term "potato flakes."

a. Broken Cells

The potato cells are defined as the individual pockets, surrounded by cellulosic material, which contain not only amylopectin and amylose but also water soluble flavor precursors, nutrients, minerals, lipids, and proteins. The percentage of broken cells is an indication of the degree of cook and starch damage that has occurred during processing. A large number of broken cells indicate improper processing conditions such as overcooking, overheating during drying, or use of too much shear to reduce the particle size of the dried potato products, among other things. Because the potato flakes of the present invention are produced using a reduced cooking products, the potato flakes have fewer broken cells than conventionally produced flakes.

The potato flakes of the present invention have less than about 70% broken cells, preferably less than about 40% broken cells, more preferably less than about 30% broken cells, even more preferably less than about 25% broken cells, and still more preferably less than about 20% broken cells. The level of broken cells is surprisingly reduced when starch is incorporated into the mash, and results in potato flakes having less than about 50% broken cells, more preferably less than about 40% broken cells, and still more preferably less than about 20% broken cells.

b. Moisture

The potato flakes comprise from about 5% to about 14%, preferably from about 5% to about 12%, more preferably about 6% to about 9%, and still more preferably from about 7% to about 8% moisture.

c. Amylose (Am)/Amylopectin (Ap) Ratio

The potato flakes of the present invention have a ratio of amylose to amylopectin of from about 0.4 to about 4, preferably from about 1.2 to about 3, and more preferably from about 1.6 to about 2.5.

d. Flavor Compounds

The cooking and drying steps of potato processing generally result in significant thermal and mechanical stress to which the potatoes are subjected. One way to indirectly determine the level of quality deterioration is by measuring changes in composition.

Potato tubers contain many volatile compounds. The potato flakes produced by the practice of the present invention have substantially fewer heat generated volatile compounds than conventional flakes. Gas chromatography and mass spectrometry can be used to compare conventionally produced flakes and flakes produced by the methods of the present invention.

The flakes of the present invention exhibit lower levels of browning flavor compounds (e.g., 2-methyl butanal, 3-methyl butanal, methional, phenylacetaldehyde) compounds and lipid oxidation compounds (ethyl furan, pentyl furan, and hexanal).

The lower the volatile browning flavor compounds in the flakes, the higher the potato flavor in the finished product or snack. This is because the precursors of the flavor compounds have been preserved during the processing of the potato, and thus convert and have the reaction in the finished product rather than in the flake.

The potato flakes of this invention have a reduction in these processed flavor compounds as compared to those in conventional flakes. Mashed potatoes prepared with the flakes of the present invention showed cleaner and more potato flavor than conventional flakes.

It was found that flakes made according to the present invention can be distinguished from conventional flakes by calculating a Potato Flake Flavor (PFF) value, as defined by the following equation:

$$PFF=\ln(2\text{-Heptanone}/3\text{-methylbutanal})+\ln(2\text{-Heptanone}/2\text{-Ethylfuran})$$

2-Heptanone is an internal standard used in the analytical procedure, as described in the Analytical Methods section herein. 2-Methylbutanal and 2-Ethylfuran are key volatile flavor compounds that mark or represent specific flavor chemistries. They are measured in terms of peak area counts, as described in the Analytical Methods section herein.

Traditional potato flakes typically have PFF values of from about 3.6 to about 6.8. The potato flakes of the present invention, however, have a PFF value of from about 7 to about 10.8, preferably from about 8 to about 10.8, and more preferably from about 9 to about 10.8.

C. Fabricated Chip Preparation

Although the present invention will be described primarily in terms of a preferred fabricated chip made from flakes, it should be readily apparent to one skilled in the art that the dehydrated potato products of the present invention can be used in the production of any suitable food product.

For instance, the dehydrated potato products can be rehydrated and used to produce food products such as mashed potatoes, potato patties, potato pancakes, and other potato snacks such as extruded French fries and potato sticks. For example, dehydrated potato products can be used to produce extruded French fried potato products such as those described in U.S. Pat. No. 3,085,020, issued Apr. 9, 1963 to Backinger et al., and U.S. Pat. No. 3,987,210, issued Oct. 18, 1976 to Cremer, both of which are herein incorporated by reference. The dehydrated potato products can also be used in breads, gravies, sauces, or any other suitable food product.

An especially preferred use of the dehydrated potato products is in the production of fabricated chips made from a dough. Examples of such fabricated chips include those described in U.S. Pat. No. 3,998,975 issued Dec. 21, 1976 to Liepa, U.S. Pat. No. No. 5,464,642 issued Nov. 7, 1995 to Villagran et al., U.S. Pat. No. 5,464,643 issued Nov. 7, 1995 to Lodge, and PCT Application No. PCT/US95/07610 published Jan. 25, 1996 as WO 96/01572 by Dawes et al., all of which are herein incorporated by reference.

The production of a preferred fabricated chip is set forth in detail below.

1. Dough Formulation

The preferred doughs of the present invention comprise from about 35% to about 85%, preferably from about 50% to about 70%, of a starch-based flour. The starch-based flour comprises from about 25 to 100% potato flakes as described above, with the balance (from about 0% to about 75%) being other starch-based flour such as, but not limited to, potato flour, potato flanules, potato granules, corn flour, masa corn flour, corn grits, corn meal, rice flour, buckwheat flour, rice flour, oat flour, bean flour, amaranth flour, barley flour, or mixtures thereof.

The doughs of the present invention comprise from about 15% to about 50% added water, preferably from about 22% to about 40%, and more preferably from about 24% to about 35%, added water. The amount of added water includes any water used to dissolve or disperse ingredients and includes water present in corn syrups, etc. For example, if ingredients such as maltodextrin or corn syrup solids are added as a solution or syrup, the water in the syrup or solution is included as "added water".

Optional Ingredients

The dough can optionally include a starch such as a native, modified, or resistant starch. From about 0.1% to about 70%, more preferably from about 5% to about 60%, and most preferably from about 15% to about 40% starch may typically be added. The starch can be derived from tubers, legumes, or grains and can include, but is not limited to, cornstarch, wheat starch, rice starch, waxy corn starch, oat starch, cassava starch, waxy barley, waxy rice starch, glutinous rice starch, rice starch, sweet rice starch, potato starch, tapioca starch, amaranth starch, sago starch, or mixtures thereof. When calculating the level of starch according to the present invention, starch that is inherent in the other ingredients, such as potato flakes, potato flanules, potato granules, and flours, is not included. (The level of starch is that which is added over and above that level inherently present in the other dough ingredients.)

Modified starch selected from the group consisting of pregelatinized starches, cross-linked starches, acid modified starches, and mixtures thereof may optionally be included to improve the texture (i.e. increase the crispness) of the fabricated chip, although the addition of modified starch is not required, and is not as preferred for use in making the fabricated chip of the present invention. From about 0.1% to about 20%, more preferably from about 1% to about 10%, and even more preferably from about 3% to about 7%, modified starch may typically be added. If used, the modified starches which are preferred are available from National Starch and Chemical Corporation, Bridgewater, N.J. and are sold under the trade names of N-Lite™ (pregelatinized-crosslinked starch, Ultrasperse -A™ (pregelatinized, waxy corn), and N-Creamer™ 46 (substituted waxy maize). Also preferred is Corn PCPF400™ (partially pre-cooked corn meal), available from Bungee Lauhoff Corn Milling, St. Louis, Mo. When calculating the level of modified starch according to the present invention, modified starch (e.g., gelatinized starch) that is inherent in the other ingredients, such as potato flakes, potato flanules, potato granules, and flours, is not included. (The level of modified starch is that which is added over and above that level inherently present in the other dough ingredients.)

Hydrolyzed starch is a preferred modified starch that can be optionally included in the doughs of the present invention. When included, hydrolyzed starch is typically added to the dough at a level of from about 1% to about 15%, preferably from about 3% to about 12%. This amount of hydrolyzed starch is in addition to the quantity of any other added starch. Suitable hydrolyzed starches for inclusion in the dough include maltodextrins and corn syrup solids. The hydrolyzed starches for inclusion in the dough have Dextrose Equivalent (D.E.) values of from about 5 to about 30, preferably from about 10 to about 20. Maltrin™M050, M100, M150, M180, M200, and M250 (available from Grain Processing Corporation, Iowa) are preferred maltodextrins. The D.E. value is a measure of the reducing equivalence of the hydrolyzed starch referenced to dextrose and is expressed as a percentage (on a dry basis). The higher the D.E. value, the higher the dextrose equivalence of the hydrolyzed starch.

Gums may also be optionally used in the dough of the present invention. Gums for use in the present invention include those ingredients generally referred to as gums (e.g., cellulose derivatives, pectic substances) as well as plant gums. Examples of suitable gums include, but are not limited to, guar gum, xanthan gum, gellan gum, carrageenan gum, gum arabic, gum tragacanth, and pectic acids having various degrees of depolymerization and methylation. Particularly preferred gums are cellulose derivatives selected from methylcellulose, hydroxypropyl methyl cellulose, carboxymethylcellulose, microcrystalline cellulose, and mixtures thereof. Gums can be included in the dough at a level of up to about 10%, preferably at a level of from about 0.2% to about 8%, and more preferably from about 2% to about 4%.

An ingredient that can optionally be added to the dough to aid in its processability is an emulsifier. Typically, emulsifiers are added to the dough in an amount of from about 0.01% to about 6%, preferably from about 0.1% to about 5%, and more preferably from about 2% to about 4%. An emulsifier is preferably added to the dough composition prior to sheeting the dough. The emulsifier can be dissolved in a fat or in a polyol fatty acid polyester such as Olean™, available from The Procter and Gamble Company. Suitable emulsifiers include lecithin, mono- and diglycerides, diacetyl tartaric acid esters and propylene glycol mono- and diesters and polyglycerol. Polyglycerol emulsifiers such as monoesters of polyglycerols, preferably hexapolyglycerols, can be used. Particularly preferred monoglycerides are sold under the trade names of Dimodan® available from Danisco, New Century, Kan. and DMG 70, available from Archer Daniels Midland Company, Decatur, Ill.

While the reducing sugar content is dependent upon that of the potatoes which were employed to prepare the dehydrated potato product, the amount of reducing sugar in the fabricated chips can be increased by adding suitable amounts of a reducing sugar such as maltose, lactose, dextrose, or mixtures thereof to the dough. Preferably, however, no reducing sugar is added. A low reducing sugar content is preferred to maintain the desired light color of the fried fabricated chips, since an excessive reducing sugar content adversely increases the rate of browning of the fabricated chip. If, in the course of frying, the fabricated chips reach the desired color too quickly because of too high a reducing sugar content, the characteristic potato flavor of the fabricated chips will not be sufficiently developed because the frying time to reach the desired color is less than would be the case if the reducing sugar content were lower. Furthermore, when reducing sugar is omitted from the formulation, the resulting fabricated chips exhibit increased aging stability and an increased resistance to breakage. In addition, the lower the level of reducing sugars the lower the initial hardness (IH) of the fabricated chip, thus reducing brittleness. (Increased crispiness means more force is required to break the fabricated chip, while brittleness means very little force is required to break the fabricated chip.)

Low molecular weight compounds such as sugars (e.g., mono- and di-saccharides) and hydrolyzed starches are very effective plasticizers, reducing the glass transition temperature (Tg) of the fabricated chip. The lower the Tg of the finished fabricated chip, the less stable the product during storage. At storage temperatures higher than Tg, the oxidation reaction rate also increases significantly. Thus, to increase the crispiness of the fabricated chip, it is desirable to minimize the level of such compounds in the dough that act as plasticizers.

Furthermore, the lower the level of reducing sugars the higher the initial hardness (IH) of the fabricated chip, thus reducing brittleness. Increased crispiness indicates that more force is required to break the fabricated chip, while brittleness indicates very little force is required to break it.

2. Dough Preparation

The doughs of the present invention can be prepared by any suitable method for forming sheetable doughs. Typically, a loose, dry dough is prepared by thoroughly mixing together the ingredients using conventional mixers. Preferably, a pre-blend of the wet ingredients and a pre-blend of the dry ingredients are prepared; the wet pre-blend and the dry pre-blend are then mixed together to form the dough. Hobart® mixers are preferred for batch operations and Turbulizer® mixers are preferred for continuous mixing operations. Alternatively, extruders can be used to mix the dough and to form sheets or shaped pieces.

The sheet strength of the dough correlates to the cohesiveness of the dough and to the ability of the dough to resist developing holes and/or tearing during subsequent processing steps. The higher the sheet strength, the more cohesive and elastic the dough.

The sheet strength of the dough of the present invention increases as the amount of energy input during the dough-making step increases. Factors which can affect energy input include, but are not limited to, mixing conditions, dough sheet formation, and the amount of measurable free amylose. Potato flakes of the present invention produced with reduced cooking show lower sheet strength due to the lower level of free amylose, the lower level of soluble amylopection, and the higher level of intact cellular structure (as represented by less cell breakage) in comparison to traditional flakes. By adding starch, especially native wheat starch, to the potato mash in accordance with the present invention, the level of free amylose is increased. The combination of reduced cooking and wheat starch addition provides a dough that is sheetable yet does not exhibit excessive cell breakage.

Doughs made from flakes of the present invention have a sheet strength of from about 80 gf to about 600 gf, preferably from about 110 gf to about 450 gf, and more preferably from about 140 gf to about 250 gf.

Figure 4A:
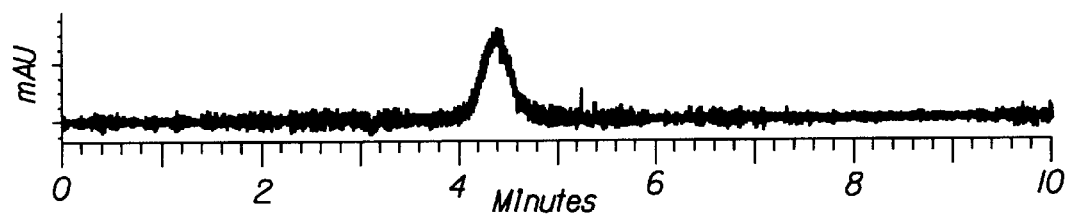
FIG. 4.
Figure 4B:
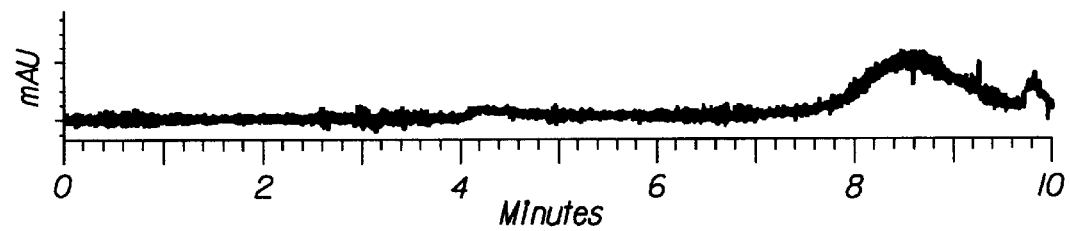

The Tg of the dough was determined by reading the temperature at which the maximum peak for tan delta was observed (FIG. 4). Doughs of this invention, especially those doughs made from flakes that were produced from a mash where starch, especially native wheat starch, was added, show a Tg of from about −15° C. to about 15° C., preferably from about −5° C. to about 10° C., and most preferably from about 0° C. to about 8° C. (at a dough moisture content of 30%).

3. Sheeting

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should preferably be heated to from about 90° F. (32° C.) to about 135° F. (57° C.). In a preferred embodiment, the mill rolls are kept at two different temperatures, with the front roller being cooler than the back roller. The dough can also be formed into a sheet by extrusion.

Doughs of the present invention are usually formed into a sheet having a thickness of from about 0.015 to about 0.10 inches (from about 0.038 to about 0.25 cm), and preferably to a thickness of from about 0.05 to about 0.10 inches (from about 0.013 to about 0.025 cm), and most preferably from about 0.065 inches to about 0.080 inches (1.65 to 2.03 mm). For rippled (wavy shaped) fabricated chips, the preferred thickness is about 0.75 inches (1.9 mm).

The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described by Dawes et al. in PCT Application No. PCT/US95/07610, published Jan. 25, 1996 as WO 96/01572, which is herein incorporated by reference.

4. Frying

After the snack pieces are formed, they are cooked until crisp to form fabricated chips. The snack pieces can be fried in a fat composition comprising digestible fat, non-digestible fat, or mixtures thereof. For best results, clean frying oil should be used. The free fatty acid content of the oil should preferably be maintained at less than about 1%, more preferably less than about 0.3%, in order to reduce the oil oxidation rate.

In a preferred embodiment of the present invention, the frying oil has less than about 25% saturated fat, preferably less than about 20%. This type of oil improves the lubricity of the finished fabricated chips such that the finished fabricated chips have an enhanced flavor display. The flavor profile of these oils also enhance the flavor profile of topically seasoned products because of the oils' lower melting point. Examples of such oils include sunflower oil containing medium to high levels of oleic acid.

In another embodiment of the present invention, the snack pieces are fried in a blend of non-digestible fat and digestible fat. Preferably, the blend comprises from about 20% to about 90% non-digestible fat and from about 10% to about 80% digestible fat, more preferably from about 50% to about 90% non-digestible fat and from about 10% to about 50% digestible fat, and still more preferably from about 70% to about 85% non-digestible fat and from about 15% to about 30% digestible fat.

Other ingredients known in the art can also be added to the edible fats and oils, including antioxidants such as TBHQ, tocopherols, ascorbic acid, chelating agents such as citric acid, and anti-foaming agents such as dimethylpolysiloxane.

It is preferred to fry the snack pieces at temperatures of from about 275° F. (135° C.) to about 420° F. (215° C.), preferably from about 300° F. (149° C) to about 410° F. (210° C.), and more preferably from about 350° F. (177° C.) to about 400° F. (204° C.) for a time sufficient to form a product having about 6% or less moisture, preferably from about 0.5% to about 4%, and more preferably from about 1% to about 2% moisture. The exact frying time is controlled by the temperature of the frying fat and the starting water content of the dough, which can be easily determined by one skilled in the art.

Preferably, the snack pieces are fried in oil using a continuous frying method and are constrained during frying. This constrained frying method and apparatus is described in U.S. Pat. No. 3,626,466 issued Dec. 7, 1971 to Liepa, which is herein incorporated by reference. The shaped, constrained snack pieces are passed through the frying medium until they are fried to a crisp state with a final moisture content of from about 0.5% to about 4%, preferably from about 1% to about 2%.

Any other method of frying, such as continuous frying or batch frying of the snack pieces in a non-constrained mode, is also acceptable. For example, the snack pieces can be immersed in the frying fat on a moving belt or basket.

The fabricated chips made from this process typically have from about 20% to about 45%, and preferably from about 25% to about 40%, total fat (i.e., combined non-digestible and digestible fat). If a higher fat level is desired to further improve the flavor or lubricity of the fabricated chips, an oil, such as a triglyceride oil, can be sprayed or applied by any other suitable means onto the fabricated chips when they emerge from the fryer, or when they are removed from the mold used in constrained frying. Preferably, the triglyceride oils applied have an iodine value greater than about 75, and most preferably above about 90. The additionally applied oil can be used to increase the total fat content of the fabricated chips to as high as 45% total fat. Thus, fabricated chips having various fat contents can be made using this additional step. In a preferred embodiment, at least 10%, preferably at least about 20%, of the total fat in the finished fabricated chips is topical surface fat.

Oils with characteristic flavor or highly unsaturated oils can be sprayed, tumbled or otherwise applied onto the fabricated chips after frying. Preferably triglyceride oils and non-digestible fats are used as a carrier to disperse flavors and are added topically to the fabricated chips. These include, but are not limited to, butter flavored oils, natural or artificial flavored oils, herb oils, and oils with potato, garlic, or onion flavors added. This allows the introduction of a variety of flavors without having the flavor undergo browning reactions during the frying. This method can be used to introduce oils which would ordinarily undergo polymerization or oxidation during the heating necessary to fry the snacks.

D. Fabricated Chip Characteristics

1. Volatile Organic Flavor Compounds

The fabricated chips of the present invention have higher levels of dimethyltrisulfide ("DMTS") and lower levels of ethylfuran ("EF") than traditional fabricated chips. This correlates to a higher degree of potato chip flavor characteristic of traditional sliced potato chips. In the present invention it was found that it is desirable to minimize the level of lipid oxidation flavors, as represented by EF, and to maximize the level of characteristic potato flavor, as represented by DMTS.

It was found in the present invention that while the composition and absolute concentration of individual flavor compounds are important, the key criteria for evaluating overall potato chip flavor can be best quantified by calculating the Potato Chip Flavor (PCF) value, which is a function of the key volatile flavor compounds, DMTS and EF, that mark or represent specific flavor chemistries.

Potato chip flavor was found to be a function of the DMTS to EF ratio, as set forth by the equation below:

PCF (Potato Chip Flavor)=4.4+((0.36)ln DMTS/EF)(n=16, Correlation coefficient=0.9)

DMTS and EF are measured in terns of peak area counts, as described in the Analytical Methods Section herein.

Traditional sliced chips typically have a PCF of from about 5 to about 6.6, whereas traditional fabricated chips typically have a PCF of from about 3.4 to about 5. The fabricated chips of the present invention, however, have a PCF value of from about 5.2 to about 6.5, typically from about 5.5 to about 6.

2. Crispiness

A higher level of whole potato cells and more of the original potato cellulosic network is intact in the fabricated chips of the present invention than in traditional fabricated chips. This leads to crispier finished fabricated chips, more closely resembling the crispiness of sliced potato chips.

Crispiness is highly correlated to the initial hardness (IH) of the fabricated chip and to its Hunter color "L" value measurement. A fabricated chip that is too light and not cooked to the end point of frying to achieve a moisture content between about 1 to about 2.5% can be dense, whereas a fabricated chip that is too dark and cooked beyond the end point of frying can be too brittle on the initial bite. The fabricated chip of the present invention has both the desired IH value and the desired color when cooked to the desired level (the frying conditions required to achieve moisture content of from about 1% to about 2.5% of the finished fabricated chip).

The preferred color is from an L Hunter value of from about 58 to about 70, more preferably from about 60 to about 68, and most preferably from about 62 to about 65. The color of the product of the present invention is correlated to L, which is the measure of Lightness of the sample, ranging 0.0 as black and 100 as white.

As measured herein, crispiness is represented by the initial hardness (IH) of the snack and by the Hunter color measurement, as defined by the equation below:

Crispiness=10,283+7.03 (IH)−398.02 (Hunter color L)−0.124(IH)(Hunter color L)+0.00065(IH)$^2$+3.78 (Hunter color L)$^2$ The snack of the present invention has a crispiness value of from about 6.3 to about 7.3, preferably from about 6.5 to about 6.9. Products of the present invention have an initial hardness of from about 740 gf to about 2000 gf. For snacks having a thickness of from about 50 to about 60, an initial hardness of from about 450 gf to about 2000 gf, preferably from about 600 gf to about 1600 gf, and more preferably from about 850 gf to about 950 gf. (Chip thickness is measured in thousandths of an inch for a single chip (0.001× 50)=0.054–0.06)

The preferred fabricated chip has a thickness of from about 48 to about 62 (Thickness is expressed as thousandths of an inch for a single chip; for example, a chip having a thickness of 50 is 0.05 inches thick [0.001×50=0.05]).

The initial hardness is the peak force measured within the first 6 seconds of a compression test, for a specific range of thickness, as described in the Analytical Methods Section below.

Fabricated chips of the present invention have an initial hardness of from about 740 gf to about 2000 gf. For fabricated chips having a thickness of from about 48 to about 62, an initial hardness of from about 450 gf to about 2000 gf, preferably from about 600 gf to about 1600 gf, and more preferably from about 850 gf to about 950 gf.

Fabricated chips of the present invention have an IH*Aw/thickness value of from about 65 to about 500, preferably from about 65 to about 500, more preferably from about 90 to about 350, and most preferably from about 100 to about 290 gf/mm.

3. Doneness

In traditional sliced potato chips, higher doneness levels are typically related to a final target color and water activity (Aw) level. In sliced chips, higher doneness levels correlate to a browner product, within a water activity range typically from about 0.05 to about 0.3.

In fabricated chips, however, the change in color of the snack during frying is not a reliable indicator of final doneness. Traditional fabricated chips are processed under high temperature (HT), shorter-residence time (ST) frying conditions because chip doughs have lower moisture content versus potatoes. Because of this HT ST process, and when the desired color level is achieved during cooking, the desired doneness and crispiness level may or may not have also been obtained. The fabricated chip can become very brown before the dough has finished cooking in the fryer. Doneness that is too low can lead to a snack that is stale and chewy. On the other hand, the fabricated chip may be overcooked because it obtained the optimal level of doneness long before the chip attained the desired color or degree of browning, thus leading to overcooking to obtain desired end point; a doneness value that is too high can lead to a chip that is glassy and brittle.

The chip of the present invention has an optimal degree of doneness. Doneness in the fabricated chip of the present invention has been found to be a function of the water activity (Aw) of the fabricated chip in addition to the initial hardness (IH) of the fabricated chip, as defined by the following equation:

Doneness=17.45+2364 (Aw)−0.58 Initial Hardness (IH)−1.92 (Aw)(IH)−2681 (Aw)$^2$+0.00061 (IH)$^2$ The snack of the present invention has a doneness of from about 4.5 to about 5.6, preferably from about 4.7 to about 5.2. A doneness value that is too low can lead to a snack that is stale and chewy, while a doneness value that is too high can lead to a chip that is glassy and brittle.

The fabricated chips of the present invention have an Aw of from about 0.05 to about 0.35. This allows for the production of a fabricated chip having the desired color level in addition to the desired levels of crispiness and doneness.

4. Fabricated Chip Stability

In addition to improved crispiness and doneness, the present invention also provides a fabricated chip with the benefits of increased stability and increased resistance to breakage. Stability relates to shelf stability, aging, and staleness.

At storage temperatures higher than the Tg, the oxidation rates of the fabricated chips are increased significantly. Therefore, by formulating foods such that the Tg of the fabricated chips is raised, not only the initial hardness value becomes more stable but the lipid oxidation rate is reduced.

The fabricated chips of the present invention (equilibrated at an Aw of about 0.30 @ 30° C.) preferably have a glass transition temperature (Tg) of from about 75° C. to about 160° C., more preferably from about 80° C. to about 140° C., and still more preferably from about 90° C. to about 120° C.

The fabricated chips of the present invention have an onset of E' (initial drop) of from about 52° C. to about 100° C., preferably from about 58° C. to about 80° C., most preferably from about 60° C. to about 70° C. In addition, the fabricated chips of the present invention have a tan delta of from about 125° C. to about 180° C., more preferably from about 135° C. to about 175° C., and most preferably from about 150° C. to about 168° C.

5. Fabricated Chip Integrity

The fabricated chips of the present invention also have a reduced level of breakage in comparison to traditional fabricated chips, indicating increased strength.

The area of the curve obtained from plotting the initial hardness vs. time (at a 1 mm per sec cross head speed) relates to the work needed to break the snack (measures total breakage, not just initial breakage; this parameter measures the area of all the peaks, not just the highest peak during analysis). This parameter is referred to as the Chip Integrity Value.

The chip of the present invention has a Chip Integrity Value of from about 1050 gf*sec to about 4000 gf*sec, preferably from about 1400 gf*sec to about 3000 gf*sec, and most preferably from about 1500 gf*sec to about 2000 gf*sec for chips having a thickness of from about 48 to about 62. For measurements having more than one peak, the chip of the present invention has a modulus of from about 400 gf*sec to about 4000 gf*sec.

Chips of the present invention with any number of peaks, but within the first 2.0 seconds of the measurement, have a Chip Integrity Value of from about 400 gf*sec to about 4000 gf*sec.

5. Soluble Amylopectin (Ap)

In regular sliced potato chips, the level of soluble amylopectin (Ap) is low compared to fabricated chips. This is due to the intact cell structure integrity of the potatoes. In traditional fabricated chips, on the other hand, the soluble Ap is very high, because the cellular structure of the potatoes has been disrupted during processing.

The present invention, however, results in fabricated chips having lower levels of soluble Ap, thus more closely resembling sliced potato chips. Sliced potato chips typically have a soluble Ap level of about 16%. The fabricated chips of the present invention have from about 5% to about 21%, preferably from about 7.5% to about 19%, and most preferably from about 10% to about 16% soluble Ap.

Analytical Methods

Parameters used to characterize elements of the present invention are quantified by particular analytical methods.

These methods are described in detail as follows. (All laboratory instruments should be operated according to manufacturers' instructions, as set forth in the instrument operation manuals and instructional materials, unless otherwise indicated.)

1. Fat Content

The method used to measure total fat content (both digestible and non-digestible) of the fabricated chip herein is AOAC 935.39 (1997).

Digestible Fat Content

Digestible lipid (NLEA) method AOAC PVM 4:1995 is used to determine the digestible fat content of the fabricated chip herein.

Non-Digestible Fat Content

Non-Digestible Fat Content=Total Fat Content−Digestible Fat Content

2. Moisture Content

The moisture content of a fabricated chip can be determined by a forced air oven volatiles method as follows:

Equipment

Forced air oven, aluminum tins with lids, Cabinet-type desiccator

Procedure

1. Weigh tin and lid to 0.000 1 grams and record weight as tare weight
2. Place 2–3 gram ground chip sample into tin, weigh to 0.0001 grams and record as gross weight
3. Set oven temperature to 105° C.
4. Place tin containing the chip sample in oven for 1 hour, uncovered
5. Remove tin containing the sample from the oven, cover the tin, and place in desiccator until cooled to room temperature
6. Weigh tin, lid and dried sample to 0.0001 grams and record as final dried weight Calculations 1. Sample weight=gross wt.−tare wt.
2. Final weight=weight recorded in step 6
3. Moisture Content (%)=[(gross wt−final wt.)/sample wt]×100.

3. Volatile Flavor Compounds

Flavor Analysis Using a Modified Purge and Trap Technique with Gas Chromatography and Mass Spectrometry Flavor Analysis Using a Modified Purge and Trap Technique with Gas Chromatography and Mass Spectrometry—References:

1. D. D. Roberts and T. E. Acree, "Simulation of Retronasal Aroma Using a Modified Headspace Technique" Investigating the effects of Saliva, Temperature, Shearing, and Oil on Flavor Release", J. Agric. Food Chem. 1995, 43, 2179–2186.
2. S. Maeno and P. A. Rodriguez, "Simple and versatile injection system for capillary gas chromatographic columns Performance evaluation of a system including mass spectrometric and light-pipe Fourier-transform infrared detection", J. Chromatogr. A 1996, 731, 201–215.
3. P. A. Rodriguez, R. Takigiku, L. D. Lehman-McKeeman, M. Fey, C. L. Eddy and D. Caudill, J. Chromatogr. A 1991, 563, 271.
4. G. I. Roth and R. Calmes, Oral Biology; C. V. Mosby: St. Louis, Mo., 1981.

A retronasal aroma simulator (RAS) (ref. 1) that incorporates synthetic saliva addition, regulated shearing, gas flow, and temperature is used to generate the aromas of dehydrated potato products under specific conditions. The aromas are purged from the RAS with helium and trapped with a polymeric adsorbent trap. The trapped aromas are then thermally desorbed onto a gas chromatograph that is modified to accommodate large volume injections (ref. 2) and is equipped with a mass selective detector. The level of each aroma compound is expressed as a peak area for a selected ion (m/e) at the retention time of each aroma compound (m/e for Ethyl Furan=96, m/e for 3-methyl butanal=71, m/e for Dimethyl Trisulfide=126, m/e for the internal standard 2-heptanone=114). In this way, the relative levels of each aroma compound in different samples can be compared using ratios of the peak areas for the selected ion at the retention time of the aroma compound.

Materials

Chemicals are of analytical grade and gases are of high purity. The synthetic saliva is chosen to contain the buffering system of simulated saliva (ref. 4): 20 mM $NAHCO_3$, 2.75 mM $K_2HPO_4$, 12.2 mM $KH_2PO_4$, and 15 mM NaCl with a pH of 7.0.

Apparatus

1. A retronasal aroma simulator (RAS), equivalent to one described in ref. 1, consists of a 1-liter stainless steel Waring blender with a screw-top lid and a copper coiled water jacket to control the temperature in the RAS to 37° C. The RAS is connected to a variable autotransformer.
2. A trap (ref. 2 and 3) consists of a 1-ml syringe barrel with a threaded glass tip packed with deactivated glass wool and Tenax GR (60/80 mesh, 250 mg).
3. Gas Chromatograph (GC): Hewlett Packard (HP) model 6890: the GC is modified to accommodate the injection of an adsorbent trap and cryo-focus of the thermally desorbed aromas.
4. GC column: Durabond-59 Mass Spectrometer (30 meters in length, 252 mm column ID and 1.0 mm film thickness) obtained from J&W Scientific of Folsom, Calif., USA.
5. Carrier gas, helium, 2 ml/min. flow rate.
6. The Detector is a model HP 5973 Mass Selective Detector obtained from Hewlett Packard, Santa Clarita, Calif., USA having a source temperature of about 230° C., and a MS Quad temperature of about 150° C.

Analysis Procedure

1. Thermostat RAS to 37.0° C.
2. Add 200 mls of artificial saliva solution to the dry RAS. 200 μls of an internal standard solution (2-heptanone, 500 ppm in water) is added to the RAS.
3. Connect purging helium line to RAS with valve off. Purging flow is set to about 54 ml/min.
4. Weigh 20.0 grams of flake samples (or 50.0 grams of chip samples) and add sample to RAS.
5. Close the lid of RAS. Connect the trap (preconditioned) to the RAS.
6. Turn purging helium on and start the RAS (voltage setting 60 Volts on variable autotransformer) and start timer.
7. Turn blender off after 30 seconds, but collect volatiles for a total of 10 minutes.
8. After collection, back purge the trap with dry helium at a flow of about 43 ml/min for 30 minutes.
9. Start sequence of sample loading and analysis. In this step, the precolumn is cooled to about −90° C., then the trap is connected to a helium flow (flow rate about 15 ml/min) and is heated to desorb the trapped aroma compounds. After the loading is finished, the GC-MS analysis is as follows. The following temperature program is used:
  i) an initial temperature of about 50° C. which is held for 1 minute,
  ii) increase the initial temperature at a rate of about 4° C./min until a temperature of about 250° C. is reached,
  iii) hold at about 250° C. for 1 minute.
10. Flavor compounds are identified using the MS spectral libraries of John Wiley & Sons and the National Institute of Standards and Technology (NIST), purchased and licensed through Hewlett Packard.
11. Chromatographic peaks are integrated using the Chemstation software obtained from Hewlett Packard, Santa Clarita, Calif., USA.

4. Firmness (Consistency) of Potato Mash by Back Extrusion Method

Adherence of the potato mash to a drum dryer and applicator rolls depends in large part upon required product consistency and firmness. A mash consistency that is too thin may indicate overcooking and high moisture content and will not adhere to the rolls. Similarly, a mash consistency that is too thick may indicate under cooking and may contain pieces of uncooked potato which will impede mash adherence to the drum and rollers. The mash consistency and firmness can be assessed by a back extrusion test which will give an indication of product physical attributes and viscosity.

Apparatus

TA-XT2 Texture Analyzer, (TA Instruments, Corp., New Castle, Del.) with A/BE Back Extrusion Cell consisting of a locating base plate, sample containers (50 mm internal diameter), three compression discs (35, 40, 45 mm diameter), and a heavy duty probe adapter. The 45 mm discs are used to measure potato mash firmness. A 25 kg load cell is utilized to calibrate the instrument. The instrument is calibrated according to instrument manual instructions (See STABLE MICRO SYSTEMS LTD Guide, Version 1.00).

The back extrusion rig consists of a perspex base plate which is used to centrally locate the sample container beneath a disc plunger. The sample is deposited into the sample container and a compression test extrudes the product up and around the edge of the disc and relates to measurements of viscosity. Three disc diameters are provided to allow flexibility of products to test. Selection depends primarily on the type of product to be tested and whether it contains any particulates.

TA-XT2 Settings

| Mode: | Measure Force in Compression |
|---|---|
| Option: | Return to Start |
| Pre-Test Speed: | 4.0 mm/s |
| Test Speed: | 1.0 mm/s |
| Post-Test Speed: | 1.0 mm/s |
| Distance: | 35 mm* |
| Trigger Type: | Auto–10 g |
| Data Acquisition Rate: | 250 pps |

Test Set-up

The tests are carried out in a standard size back extrusion container (50 mm diameter) immediately after removal from the process sampling point. Temperatures of the sample remain constant. The extrusion disc is positioned centrally over the sample container.

For comparison of stickiness and "work of adhesion," the probe must return to the same position above the samples after each test. To do this it is necessary to calibrate the probe to a distance which is a starting distance of about 30 mm above the top of the pot or the sample surface.

For the purpose of comparison the test temperature and container geometry should be the same (and should always be specified) when reporting results.

Note: The distance of extrusion to be set in the TA Settings will depend upon the depth of the sample within the container, the depth of the container, and whether the chosen container is tapered towards the base or not. The chosen depth should be such that the extrusion disc does not come into contact (or indeed approach very close) to either the walls or base of the container during testing, which could produce an erroneous result.

When a 10 g surface trigger is attained (i.e. the point at which the disc lower surface is in full contact with the product) the disc proceeds to penetrate to a depth of 25 mm (*or other specified distance). At this point (i.e. the maximum force), the probe returns to its original position. The 'peak' or maximum force is taken as a measurement of firmness—the higher the value the more firm is the sample. The area of the curve up to this point is taken as a measurement of consistency—the higher the value the thicker the consistency of the sample.

The negative region of the graph, produced on probe return, is a result of the weight of sample which is lifted primarily on the upper surface of the disc on return, i.e. due to back extrusion and hence gives again an indication of consistency/resistance to flow off the disc. The maximum force is taken as an indication of the stickiness (or may in this case be referred to as cohesiveness) of the sample—the more negative the value the more 'sticky' or 'cohesive' is the sample. The area of the negative region of the curve is often referred to as the 'work of adhesion'—the higher the value the more resistant to withdrawal the sample is which is perhaps an indication again of the cohesiveness and also consistency/viscosity of the sample.

Reference

Stable Micro system LTD Guide Version 1.00

5. Hardness of Potatoes (Texture Profile Analysis—TPA)

This method measures the force required to penetrate a 1 cm×1 cm×1 cm piece of potato until it reaches the center. This force correlates to the degree of cook of the potato. Raw potatoes are tougher and therefore the force required to reach the center of the potato piece is greater.

Apparatus

TA-XT2 Texture Analyzer with P/2N 2 mm Needle Proble using a 5 kg load cell was utilized.

TA-XT2 Settings

| Option: | TPA |
|---|---|
| Pre-Test Speed: | 1.0 mm/s |
| Test Speed: | 1.0 mm/s |
| Post-Test Speed: | 1.0 mm/s |
| Distance: | 30% strain |
| Trigger Type: | Auto–5 g |
| Time: | 3 sec |
| Data Acquisition Rate: | 200 pps |

Sample Preparation

1 $cm^3$ samples are prepared from potatoes cooked for various times, including 0 minutes (i.e. raw). A minimum of 5 samples are taken from each cook time to reduce variation.

Test Conditions and Set-up

Immediately after cooking and cutting, each cube is placed on a heavy duty platform, positioned centrally under the 2 mm needle probe (attached to the load cell carrier) and the penetration test commenced. The top surface of the cube should be flat and level with the platform (i.e. no slant). Before each test, the probe should be carefully wiped clean to remove all adhering debris.

6. Flake Color

Browning of dehydrated products caused by raw materials, processing conditions, and storage has been an issue for the dehydration industry. In this application, two methods have been utilized to determine differences in color due to processing conditions: Hunter Colorimeter and Optical Density Spectrum.

Hunter Color Determination

Objective

To determine differences in color of the finished fabricated chips, to relate to the flakes of the present invention. The flakes were made with significant shorter residence time both in the cooker and the drier. As a result of this, the color of the flakes is lighter.

Principle

This instrument simulates the color perception via human eye. "L", "a", "b", are coordinates in a color plane that indicates the area where the sample is located. The "L" scale is from black to white, "a" is from green to red, and "b" is from blue to yellow.

In the case of partial peeled slices or unpeeled whole potatoes, the skin of the potatoes contributes to color.

Equipment

Hunter Colorimeter, Model D25A-PC2, Reston, Va.

Methodology

1. Ensure correct calibration has been performed before utilizing the instrument.
2. Adjust temperature of sample to 70° F.±2° F. (21° C.±1.1° C.)
3. Utilize a ground sample of potato flakes
4. Pour sample into clean and dry sample cup to cover black ring and insert a clean, dry white insert in each cup.
5. Place a sample cup over the speciment port; cover the sample cup with the port cover (ensure there are no air bubbles).
6. Press the F3 key. There are two scales and this key will toggle between the two. Use the Hunter L, a, b, scale.
7. Press the F1 key to read the L, a, b values.

7. Soluble Amylose and Soluble Amylopectin

Measuring Soluble Amylose and Amylopectin in Potato Flakes, Dough and Chips Using Capillary Electrophoresis In the starchy food system, granules represent dispersed material within the continuous polymeric system comprising amylopectin and amylose. Granular melting proceeds stepwise through swelling, crystalline melting, loss of birefringence and finally starch solubilization. Solubility of amylopectin is specifically a marker for changes in starch morphology and starch structural degradation. It is a marker for morphology because amylopectin resides in the crystalline region inside starch granules. Increase in amylopectin solubility indicates that morphological changes have occurred. Amylose is a marker for amorphous areas in a granular structure. Soluble amylose appears through early leaching during the granular swelling while the granule is still intact. Subsequently, amylose disappears from the solution through active complexation with emulsifiers and fast recrystallization (retrogradation). In addition, amylose can be used as a marker compound to study interactions of ingredients during processing.

This method measures the soluble amylose and soluble amylopectin under specific solubilization conditions described below. Amylose and amylopectin are analyzed using the capillary electrophoresis iodide affinity system.[1,2]

Sample Preparation for Flakes

Potato flake samples (100 mg) are immersed in 10 ml of 5 mM phosphate buffer, pH 5 and boiled for 1.5 hours in vials set on the water bath. After cooling the samples are filtered through 0.45 μm filters and injected into the capillary electrophoresis iodide affinity system (CE-IA).

Sample Preparation for Dough and Chips

About 300 mg of dough or 800 mg of a chip homogenate (same as in the volatiles analysis method, 50 grams of chip with 200 ml of artificial saliva) is dissolved in 10 ml of 5 mM phosphate buffer, pH 5, by boiling for 1.5 hours in the sealed container in the water bath. After cooling to room temperature, the samples are filtered through 0.45 μm Gelman HT Tuffryn Acrodise syringe filters and injected into the capillary electrophoresis iodide affinity system (CE-IA).

Capillary Electrophoresis Conditions

The instrument: Hewlett Packard 3D Capillary Electrophoresis with detection at visible wavelength 560 nm is used. Amylose and amylopectin are separated with sulfonic acid-coated (50 μm, i.d.×50 cm) capillary from Microsolv CE, Scientific Resources Inc.

Separation buffer is 10 mM sodium citrate (pH 6), 4 mM potassium iodide and 1.3 mM iodine Samples are injected for 6 s by pressure injection (50 mbar). Applied separation voltage is 22 kV (a detector connected at negative ground). Capillary temperature is set at 30° C. The system separates amylopectin and amylose bands, which can be quantitated by comparing peak areas in samples to the peak areas in the standard materials.

Calculation of Results

All peak areas are integrated manually by drawing the baseline similarly in samples and in standards samples. Amylopectin migration time is at about 4.3 min. and amylose about 8–9 min. Marker signal for the electroosmotic flow is at 3 min. (FIG. 4). FIG. 4 sets forth CE-IA electropherograms of amylopectin from potato amylopectin (A) and potato amylose, recrystallized twice with thymol from potato starch (B). (Standard concentrations 2 mg/ml) Amylopectin and amylose amounts are calculated as mg per 100 mg of flakes and as mg per 200 mg of chips as dry weight basis, respectively. Amylose and amylopectin ratios are calculated by dividing amounts of amylose and amylopectin expressed in the above described units for flakes and chips.

References

1. Brewster, J. D; Fishman, M. L. J. Chromatogr. A 1995, 693, 382–387
2. Soini, H. A.; Novotny, M. V., Polysaccharide Applications, 1999 (Eds. El-Nokaly, M; Soini. H. A), ACS Symposium Series 737, Chapter 22, 317–328

8. Color of Finished Fabricated Chip

Color Determination for Finished Product

Scope

The determination of color for finished products is based on "L", "a", and "b", parameters from the Hunter Colorimeter Scale. Color is a very important sensory attribute as a contributor for appearance, as an indirect indicator for texture (crispiness).

Equipment

Minolta Colorimeter CR-310

Measurement Description

L* is the measure of light in the sample ranging 0.0 as black and 100.0 as white.

a* measures the amount of green to red in the sample, −60.0 represents green and +60.0 m represents the amount of red in a sample.

b* represents the amount of blue to yellow in a sample −60.0 represents blue, where +60 represent yellow.

Method

Samples are reduced in particle size using a screen (20 mesh) to select the desired particle size distribution to reduce variation.

1. Attach the computer with Minolta Spectra Match installed.
2. Attach the colorimeter lamp with the data processor.
3. Install the protection key into the printer port.
4. Turn on the computer and open Spectra Match software program.
5. Turn on the calorimeter.
6. Place the white calibration plate on the measuring head to calibrate so that no external light enters. Click on the calibration icon.
7. With the measuring head facing upward, place a chip selected as a standard on the light projection tube. Center the chip so that as much of the chip as possible is in the field of view.
8. Carefully place a box over the chip presentation so that minimal light enters to influence the sample.
9. Click on the standard icon. Enter the necessary information which describes the sample.
10. If desired, use the averaging function, which takes the average of the sample.
11. When the box is in place, click on the "measure" button. Record measurements.
12. Take the box off. If necessary to confirm the measurement, reposition the chip and measure the same chip again.
13. Repeat the procedure 10 times to get an average of the sample to confirm reproducibility.

9. Initial Hardness and Fabricated Chip Integrity

Scope

Fabricated snacks possess attributes of initial hardness (texture) and integrity (strength) that can be used to differentiate them from each other. Low integrity products, such as weak potato crisps, can experience breakage during manufacturing, packaging, shipping, and storage. Water activity, moisture content, thickness and initial hardness affect the product integrity. To measure both initial product hardness and product integrity, a force of compression test is conducted.

Equipment

TA-XT2 Texture Analyzer with a 100 mm diameter compression disc, a heavy duty platform, and a 100 mm diameter sample cell with a slotted bottom. The 25–1 kg load cell is used.

TA-XT2 Settings

| Mode: | Measure Force in Compression |
|---|---|
| Option: | Return to Start |
| Pre-Test Speed: | 2.0 mm/s |
| Test Speed: | 1.0 mm/s |
| Post-Test Speed: | 10.0 mm/s |
| Distance: | 12.0 mm |
| Trigger Type: | Auto–100 g |

Sample Preparation and Test Set-up

Ten fabricated chips from each sample can/lot are selected, weighed, measured for thickness, analyzed for water absorption, and placed into the sample cell. The fabricated chips are placed perpendicular to the slots in the bottom of the base plate in the sample cell.

Initial Hardness (gf)

When a 100 g surface trigger is attained (i.e. the point at which the compression disc encounters a force of 100 g with the product) the disc proceeds to penetrate to a depth of 12 mm. At this point, the compression disc returns to its original position. The maximum or "peak" force is taken as a measurement of initial hardness—the higher the value the crispier and stronger the sample. The time stamp of the peak force is also recorded and is an indicator of the flexibility (softness) of the product.

Figure 3:
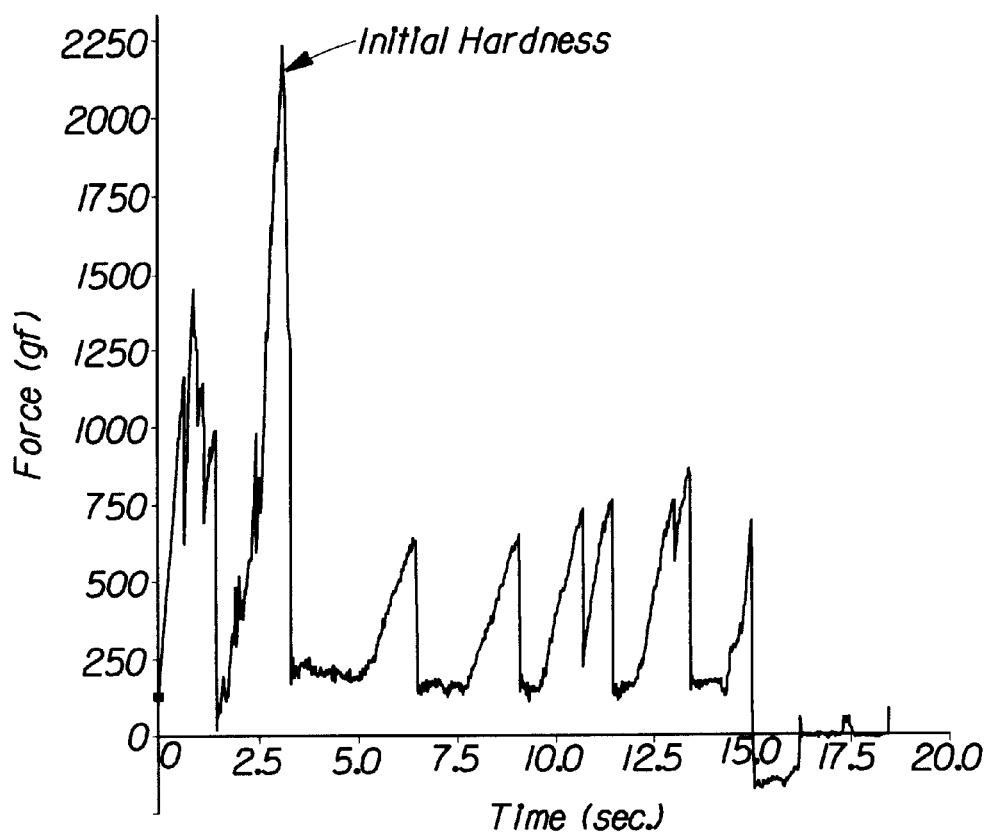
FIG. 3.

FIG. 3 shows an example of a typical graph obtained from force vs. time for low moisture products.

The number of peaks is also identified as an indication of the initial hardness (crispness) of the crisp. A force threshold value is used to filter the size of the peaks. The threshold is the value on either side of the test value that is more negative than the test value. Peak analysis is conducted on the first six seconds of compressions.

Product Integrity (gf*sec)

Product integrity is a measurement of the resistance to breakage of the product. It is defined by the Chip Integrity Value, as defined by the area of the curve obtained from peak force vs. time (displacement). The measurement includes all peaks. In this case the crosshead test speed is 1 mm/sec, therefore the product integrity is obtained by dividing the force by the time.

Data Analysis

Once the results have been obtained, a macro is applied to obtain the test values. A macro developed for fabricated chips is indicated below:

CLEAR GRAPH RESULTS
GO TO MIN. TIME
DROP ANCHOR 1
GO TO TIME . . . 6 SEC
DROP ANCHOR 2
FORCE MAXIMA 1
MARK VALUE . . . FORCE RECORD VALUE
MARK VALUE . . . TIME RECORD VALUE
AREA RECORD VALUE
COUNT+ve PEAKS . . . FORCE RECORD VALUE
SET THRESHOLD . . . FORCE 150 G

Reference

STABLE MICRO SYSTEMS LTD Guide Version 1.00

10. Glass Transition Temperature Measurements for Dough and Fabricated Chip

Glass Transition Temperature (Tg) measurements are performed on the Perkin Elmer Dynamic Mechanical Analyzer DMA-7e. A 3-point bending configuration is utilized with a 10 mm bottom platform and a 5 mm round probe tip. The sample is sliced and placed on the platform.

Figure 2:
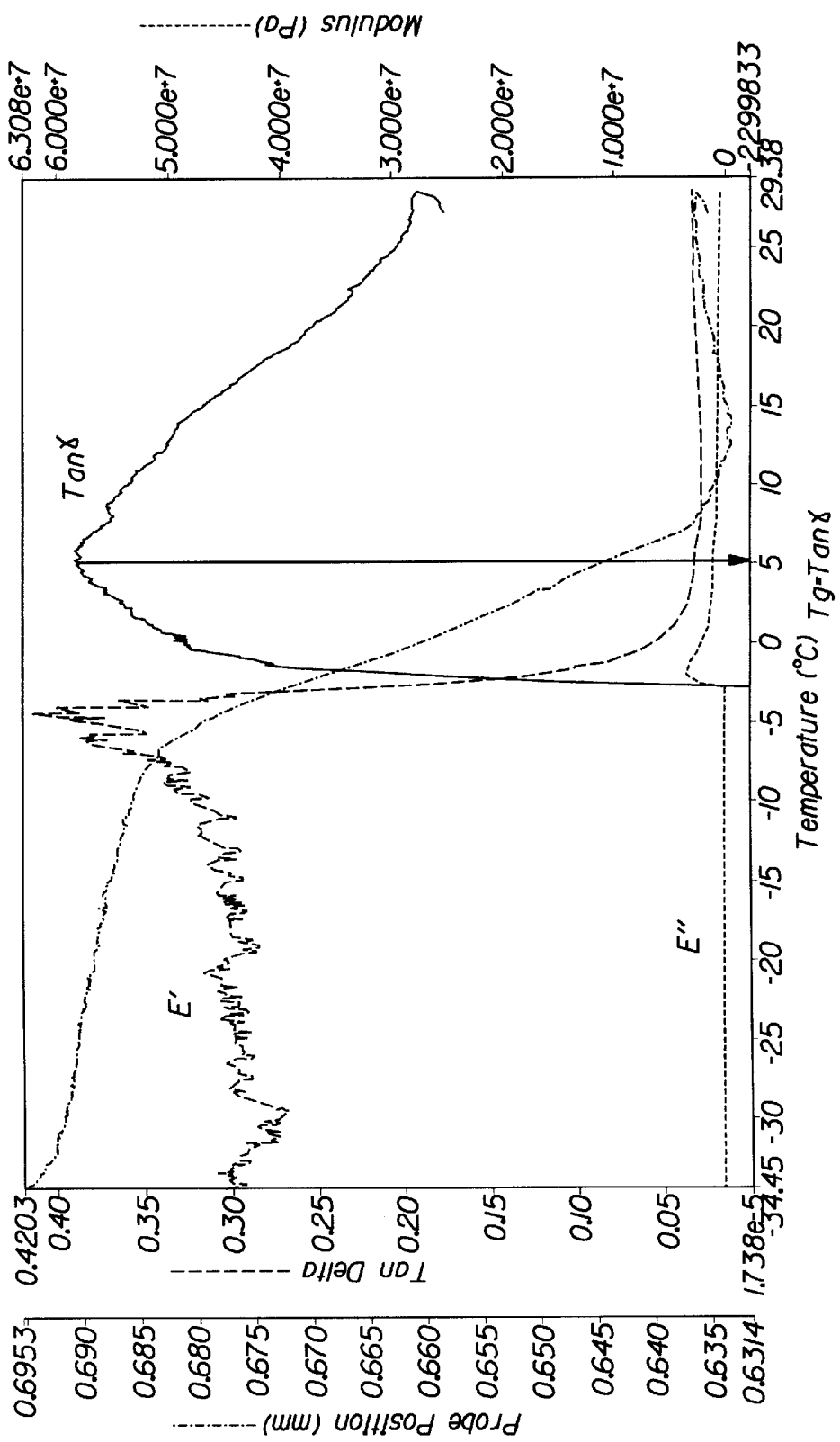
FIG. 2.

For doughs, 50 mN static force and 30 mN dynamic force at 1 Hz frequency are used. Temperature is ramped from −30° C. to 30° C. at 2° C./min. The glass transition temperature is determined as the sharp decrease in E' as it is shown in FIG. 2.

For finished fabricated chip product, 100 mN static force and 85 mN dynamic force at 1 Hz frequency is used. Temperature is ramped from 25° C. to 160° C. at 5° C./min. The glass transition temperature is determined by a maximum in tan δ (tan delta) after a decrease in the E' plot. An example of this curve is shown in FIG. 1, which shows the Glass Transition Measurement for Fabricated Chips (Aw=0.3).

11. Water Activity (Aw)

The water activity is defined as the ratio $A_w = p/p_o$, where p represents the actual partial pressure of water vapor and $p_o$ the maximum possible water vapor pressure of pure water (saturation pressure) at the same temperature. The $A_w$ level is therefore dimensionless; pure water has a level of 1.0, and a completely water-free substance has a level of 0.0. The relationship between the equilibrium relative humidity ERH in a food and the water activity is $A_w \times 100 = ERH$.

Instrument

Conductivity humidity meter Rotronic Hygroskop DT (model WA-40 TH) with an operational temperature range from 0 to 100 C., and 0 to 100% RH.

Method

1. Weigh ~5 grams of the sample and transfer it into a plastic bag.
2. Break the sample into small pieces with a flat object.
3. The samples to be measured are placed in small polysterene dishes in the bottom half of the measuring station.
4. Maintain the temperature constant by setting the equipment in a constant room temperature, or by using a water bath connected to the cells.
5. Wait until the reading of Aw does not change anymore (reading is stable). A red light from the panel will indicate that the instrument is still reading a decrease or increase in value for Aw.
6. Remove the dish with the sample from the chamber and measure moisture content.

12. Fabricated Chip Thickness

The fabricated chip thickness can be determined by taking successive local surface measurements where a digital caliper is used to take 10 random measurements of the total thickness. The caliper jaws contact the fabricated chip with one jaw on top of the fabricated chip and the other jaw contacting the underside of the opposite side of the fabricated chip. Between 5–10 fabricated chips should be measured for thickness in this way to provide a total of between 100–200 data points. The fabricated chip thickness can be taken as the average across all the measurements.

13. Water Absorption Index (WAI)

Dry Ingredients and Flour Blend

In general, the terms "Water Absorption Index" and "WAI" refer to the measurement of the water-holding capacity of a carbohydrate based material as a result of a cooking process. (See e.g. R. A. Anderson et al., *Gelatinization of Corn Grits By Roll-and Extrusion-Cooking*, 14(1):4 CEREAL SCIENCE TODAY (1969).)

The WAI for a sample is determined by the following procedure:

(1) The weight to two decimal places of an empty centrifuge tube is determined.
(2) Two grams of dry sample are placed into the tube. If a finished product (i.e. a food product such as a snack chip) is being tested, the particle size is first reduced by grinding the product in a coffee grinder until the pieces sift through a US # 40 sieve. The ground sample (2 g) is then added to the tube.
(3) Thirty milliliters of water are added to the tube.
(4) The water and sample are stirred vigorously to insure no dry lumps remain.
(5) The tube is placed in a 86° F. (30° C.) water bath for 30 minutes, repeating the stirring procedure at 10 and 20 minutes.
(6) The tube is then centrifuged for 15 minutes at 3,000 rpm.
(7) The water is then decanted from the tube, leaving a gel behind.
(8) The tube and contents are weighed.
(9) The WAI is calculated by dividing the weight of the resulting gel by the weight of the dry sample:

$$WAI = ([\text{weight of tube and gel}] - [\text{weight of tube}]) \div [\text{weight of dry sample}])$$

14. Percent Broken Cells

The percentage of broken cells of the potato flakes is determined as follows.

Sample Preparation

A 0.5% Trypan Blue stock solution is prepared by dissolving 0.5 g Trypan Blue (Aldrich, Milwaukee, Wis., USA) into 99.5 g distilled deionized 25° C. water. A 0.08% working solution of Trypan Blue is prepared by diluting 4 ml of stock solution into 21 ml distilled deionized water. Representative sub-sampling of the potato samples is critical to obtaining accurate and reproducible results. A potato sample is collected and from this, about 0.05 g is placed in an 8 ml vial. To this, 10 drops of stain is added and allowed to stand for 6 minutes. The mixture is diluted with 2.5 ml distilled deionized 25° C. water and stirred constantly with a glass stirring rod for 1 minute. One drop of sample mixture is placed on the center of a microscope slide and one drop of distilled deionized water is added. The sample mixture is gently stirred using the end of a disposable pipet until the color is even across the drop and the sample is evenly dispersed. A coverslip is then placed over the sample on the slide and the slide is examined under the microscope directly after being prepared. The examination of the slide must be completed within 20 minutes of being prepared.

Light Microscopy Examination

Light Microscopy is performed using a Nikon Eclipse E1000 microscope under brightfield illumination with a 4×objective. At this magnification, the depth of focus is such that all of the potato cells across an image are in focus. Images are collected using a Spot Camera (Diagnostic Instruments model 140 and model SP401–115) and printed to aid in counting. Variation in the photomicrographs shown are due to variations in the camera collection setting for RGB signal, not due to staining differences in the samples. For each sample, three freshly-made slides are observed under the light microscope and five images randomly selected across the slide are collected. This protocol for 3 slides and 5 images collected from each slide permits at least 300 cells to be counted. More slides can be prepared or the amount of sample dosed on each slide can be adjusted if the count is less than 300.

Grading Criteria to Assign Whole Versus Broken Potato Cells

Figure 6:
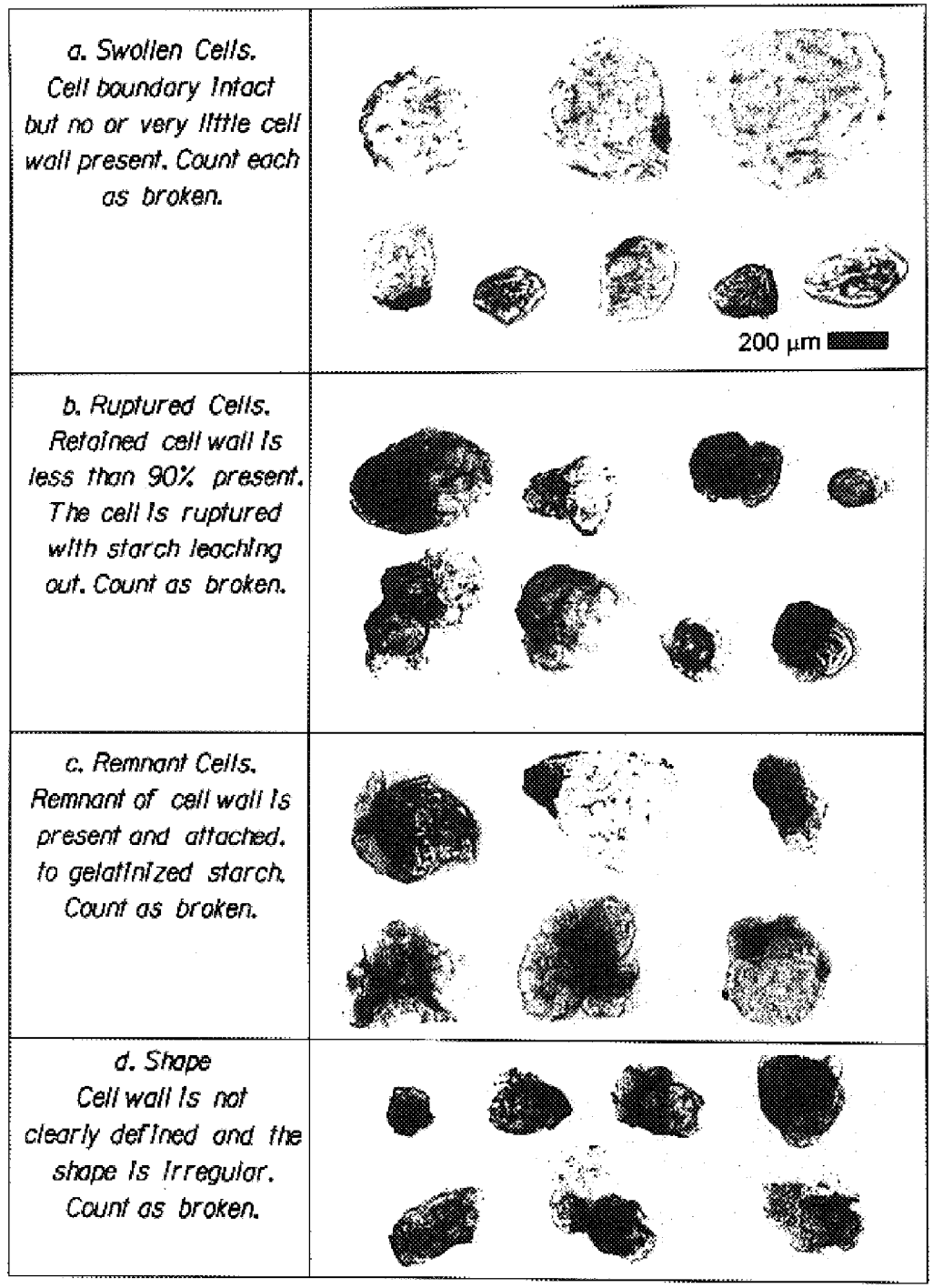
FIG. 6.
Figure 7:
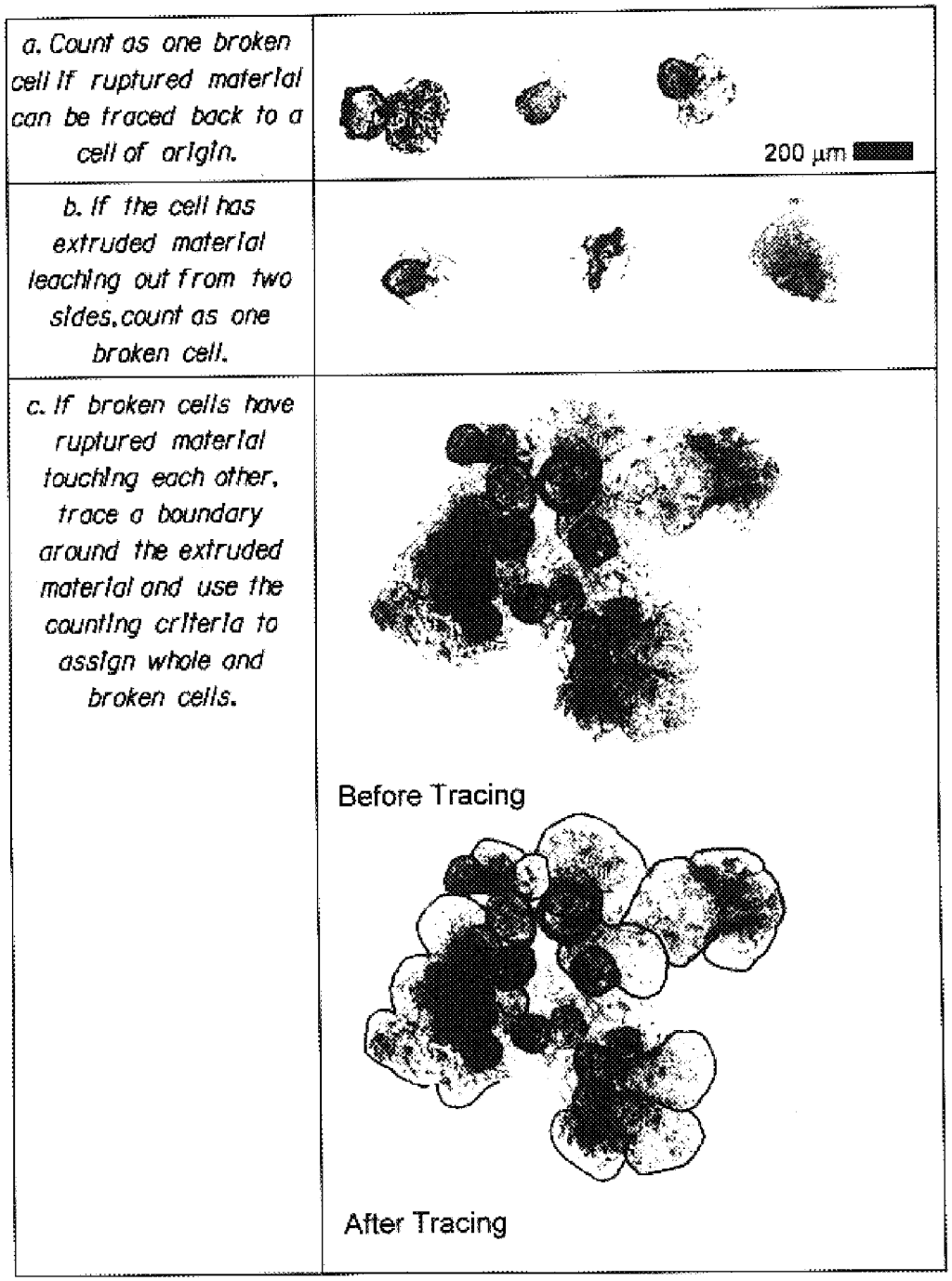
FIG. 7.
Figure 8:
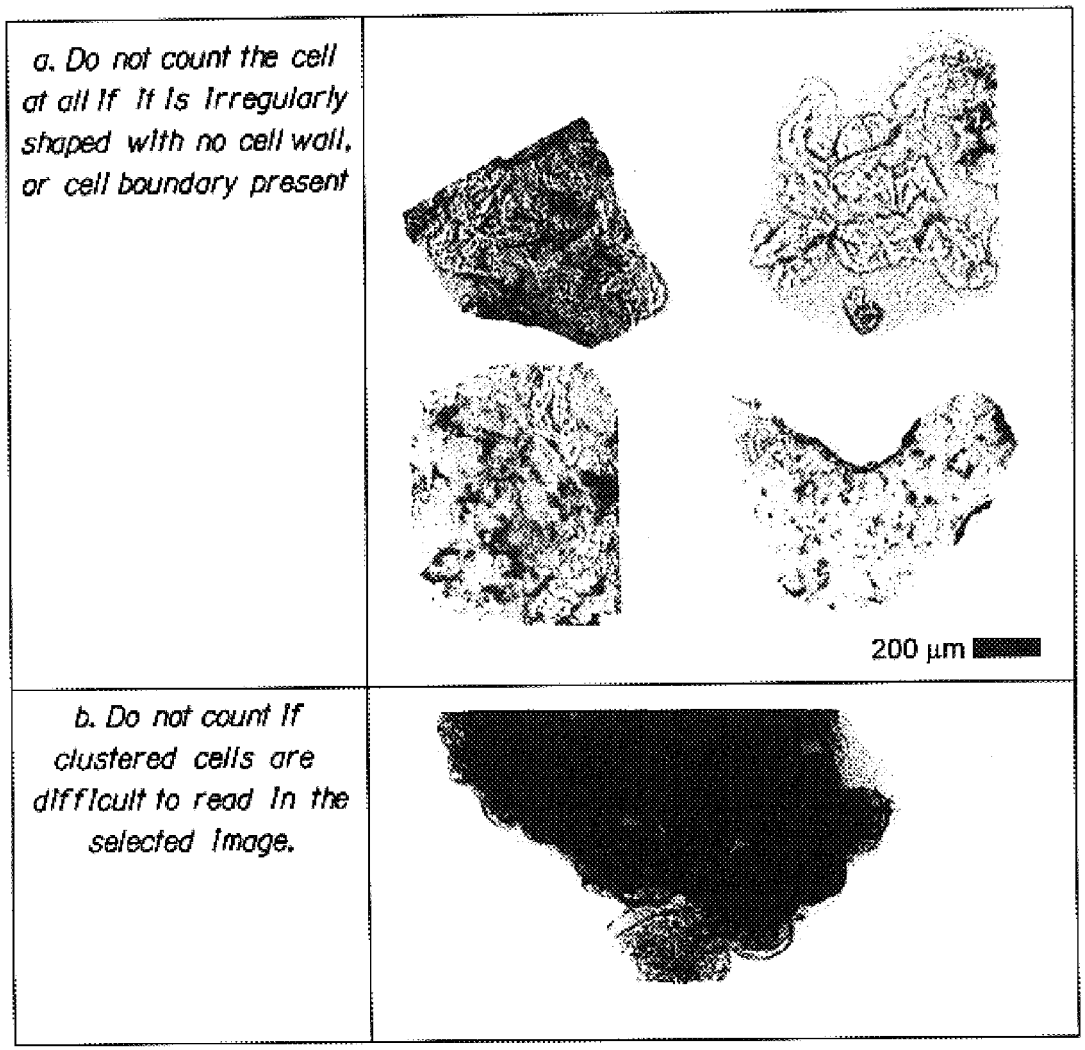
FIG. 8.

The criteria presented in FIGS. 5–8 are used to determine whole and broken cells in the acquired images. FIGS. 5(a–g) provides examples and attributes of potato cells which are counted as whole. FIGS. 6(a–d) provides images of typically observed broken cells. FIGS. 7(a–c) provides additional criteria used to count broken cells due to complexity of counting broken cells. FIGS. 8(a–b) provides additional examples of cells not included in counting.

Cell Counting Procedure

The number of broken and whole cells are counted directly from the microscope image or from a printed image using the established criteria. Cells to be counted must lie completely within the image. Total number of potato cells counted per sample is at least 300. If the count is less than 300, more images are collected. Percent broken cells is calculated from the total number of whole and broken cells counted throughout the images using the following equation:

$$\% \text{ Broken Cells} = \frac{\# \text{Broken cells}}{\# \text{Broken cells} + \# \text{Whole cells}} \times 100$$

One result of % broken cells is reported per sample.

Grading Criteria

In most food applications, such as mashed potatoes and fabricated potato chips, dehydrated potato products are used in limited water conditions and undergo limited mechanical and thermal energy input. Therefore, the free or soluble starch (amylose) that gets incorporated into the food product is largely the starch which has extruded from the cells during the making of the dehydrated potato product. Therefore, the morphological criteria defining broken versus whole potato cells are designed to quantitate the amount of cell damage due to the dehydration process.

To aid the assignment of whole versus broken cells, images of the various features observed were collected. FIGS. 5 through 8 present and describe these features and assign the cells within these features as whole or broken.

Whole cells are most often identified as a blue dyed cell with a continuous cell wall. If the cell wall is intact by at least 90%, as shown in FIG. 5d, enough of the starch material is still inside the cell such that the cell behaves essentially as an intact cell. Therefore, a cell is counted as whole if at least 90% of the cell wall is observed intact. Swollen cells are considered whole, as long as the cell wall is intact by at least 90%, as illustrated in FIG. 5e. Additionally, cells which may appear fractured are considered whole if the cell wall is intact, as shown in FIG. 5f.

A cell is considered broken if less than 90% of the cell wall is present but with at least a cell membrane surrounding the cell (shown in FIGS. 6a–d). The cell is not counted if no cell wall or cell boundary is attached to the free starch material (as shown in FIG. 8a) since it is extremely difficult to match all the free material with the cell of origin.

Additionally, to aid in counting, the potato cell is considered whole (as shown in FIG. 5g) as long as the criteria for assigning whole cells is met. However, in the case of bundles containing tightly bound cells in which it is difficult or impossible to see the cell boundaries, cells are not counted (as shown in FIG. 8b).

Application of the Method

Figure 9:
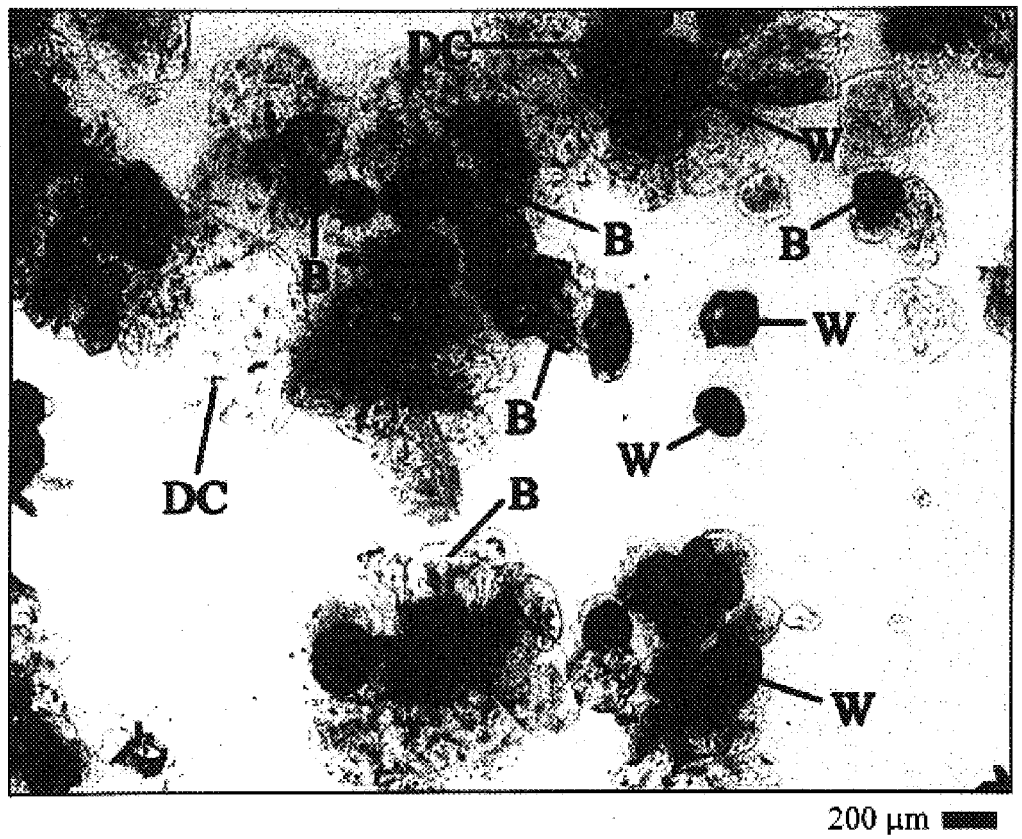
FIG. 9.

FIG. 9 shows an image of 100% Norchip potato flakes. For a demonstration of the counting procedure, several of the cells have been labeled according to their condition, including "W" for whole, "B" for broken, and "DC" for do not count.

15. Particle Size Distribution Test
1. Weigh dehydrated potatoes.
2. Weigh the screens and then stack them in the following order top to bottom: U. S. #16, #20, #40, #100 and bottom pan. Pour in the dehydrated potatoes. Put the screens in a rotap unit. Turn on the rotap unit for one minute.
3. Weigh and record the total weight of potato material on the screens.

16. Sheet Strength Test

The sheet strength is determined as follows: Sheet strength is the measurement of the force needed to break a dough sheet of 0.635 mm. The sheet strength is read as the maximum peak force (gf) of a graph obtained from force against distance. The test is designed to measure potato dough sheet strength. All products are tested at room temperature. Sheet strength is an average of ten repetitions of each test. The sheet strength is measured by preparing a dough comprising:

a) 200 g of solids;
b) 90 g of water; and
c) 0.5 g of distilled mono and diglyceride of partially hydrogenated soybean oil emulsifier available from Quest.

The dough is made in a small Cuisinart® mixer at low speed for 10–20 seconds. After mixing the dough is sheeted using a conventional milling machine to a thickness of 0.635 mm (22 mils). The mill rolls are usually 1.2 meter length× 0.75 diameter meter.

This test is conducted using a Texture Analyzer (TA-XT2) from Texture Technologies Corp. This equipment uses a software called XTRAD. This test utilizes a 7/16" diameter acrylic cylinder probe (TA-108), which has a smooth edge to minimize any cutting of the dough sheet. The dough sheet is held between two aluminum plates (10×10 cm). The aluminum plates have a 7 cm diameter opening in the center. Through this opening the probe makes contact with the sheet and pushes it downwards until it breaks. These plates have an opening in each corner to hold the sheet dough in place. Each dough sheet is pre-punched with holes to fit over the alignment pins at the corners of the plate and cut to the size (10×10 cm) of the plate. This provides uniform tension as the probe moves down and through the sheet. The probe travels at 2 mm/second until the dough sheet surface is detected at 20 grams of force. The probe then travels at 1.0 mm/second for up to 50 mm, a distance chosen to stretch the dough sheet until it thoroughly ruptures. The probe withdraws at 10.0 mm/second. The probe is run in a "Force vs Compression" mode, which means the probe will move downward measuring the force.

17. Rheological Properties Using the Rapid Visco Analyzer (RVA)

The Theological properties of the dry ingredients, flour blends, half-products and finished products are measured using the Rapid Visco Analyzer (RVA) model RVA-4. The RVA was originally developed to rapidly measure α-amylase activity in sprouted wheat. This viscometer characterizes the starch quality during heating and cooling while stirring the starch sample. The Rapid Visco Analyzer (RVA) is used to directly measure the viscous properties of the starches, and flours. The tool requires about 2 to 4 g of sample and about 25 grams of water.

For best results, sample weights and the water added should be corrected for the sample moisture content, to give a constant dry weight. The moisture basis normally used is 14% as is, and correction tables are available from Newport Scientific. The correction formulae for 14% moisture basis are:

$$M2 = (100-14) \times M1/(100-W1) \quad W2 = 25.0 + (M1-M2)$$

where
M1=sample mass and is about 3.0 g
M2=corrected sample mass
W1=actual moisture content of the sample (% as is)

The water and sample mixture is measured while going through a pre-defined profile of mixing, measuring, heating and cooling, i.e. Standard Profile 1). This test provides dough viscosity information that translates into flour quality.

The key parameters used to characterize the present invention are pasting temperature, peak viscosity, peak viscosity time and final viscosity.

RVA Method
Dry Ingredients and Flour Blend
(1) Determine moisture (M) of sample from air oven
(2) Calculate sample weight (S) and water weight (W).

(3) Place sample and water into canister.
(4) Place canister into RVA tower and run the Standard Profile (1).

EXAMPLES

The following examples are illustrative of the present invention but are not meant to be limiting thereof.

Example 1

A 50:50 mixture of whole raw Russet Burbank potatoes and Bentjie potatoes having a solids level of 20.5% are washed, rinsed and brushed with water. The whole potatoes are cooked with steam (20 psi) for about 22 minutes. The potatoes are then mashed to produce a potato mash. Wheat starch is added to the potato mash at a 6.3% level (dry basis) after cooking and mixed during the conveying of the mash to the drum dryer. The mash comprising the starch is applied to the top of three drying drums (#4, #5 and #6). No infrared heaters are employed. The drum pressures, temperatures, and speeds are listed in the table below. The drums have a diameter of 5 feet and a length of 16 feet. A thin layer of mash is formed on the drying drums. The sheet having a moisture content of 5.98% is removed from the drum by a doctor knife, combined at a flaker for sorting and milling to a particle size of 30% maximum through a 40 US mesh. The resulting flakes comprise about 26.9% amylose, about 12.3 mg/100 g Vitamin C, a WAI of about 9.35, and a peak RVA of 273.3 RVA units.

| Drum | Steam Pressure | Drum Temperature | Drum Speed | Sheet Thickness |
|---|---|---|---|---|
| #4 | 8.5 bar | 352° F. | 17.0 s/rev | 0.013 μm |
| #5 | 6.0 bar | 329° F. | 18.0 s/rev | 0.0145 μm |
| #6 | 8.1 bar | 349° F. | 18.5 s/rev | 0.013 μm |

The following composition is used to make fabricated potato chips. The dough composition comprises added 35% water (based on the total dough composition), 4% emulsifier, and 65% of the following mixture of ingredients:

| Ingredient | Wt. % |
|---|---|
| Flakes of Drum #6 | 76 |
| Native Wheat Starch | 8 |
| Corn Meal | 9 |
| Maltodextrin | 7 |

The wheat starch and corn meal are blended in a Turbulizer® mixer. The maltodextrin is dissolved in the water and added to the blend. The blend is mixed with the flakes to form a loose, dry dough.

The dough is sheeted by continuously feeding it through a pair of sheeting rolls forming an elastic continuous sheet without pin holes. Sheet thickness is controlled to 0.02 inches (0.05 cm). The dough sheet is then cut into oval shaped pieces and fried in a constrained frying model at 400° F. (204° C.) for about 8 seconds. The frying fat is a blend of cottonseed oil and MOSO (mid-oleic sunflower) oil. The fried pieces contain about 31% base fat. Additionally, oil spray is added to the exit of the fryer to raise the total fat of the chips to 38%.

The flavor and texture values (initial hardness, Aw, etc.) of the finished fabricated chips are listed below.

| Characteristic | Value |
|---|---|
| PCF | 5.5 |
| Initial Hardness | 860 |
| Aw | 0.19 |
| Tg @ Aw = 0.31 | 110° C. |
| Soluble Amylopectin | 16% |

Example 2

The following composition is used to make fabricated chips. The dough comprises 35% added water (based on the total dough composition) and 65% of the following mixture of ingredients.

| Ingredient | Wt. % |
|---|---|
| Flakes of Drum #5 | 63 |
| Native Wheat Starch | 8 |
| Corn Meal | 9 |
| Maltodextrin | 7 |
| Potato Flanules | 13 |

| Characteristic | Value |
|---|---|
| PCF | 5.3 |
| Initial Hardness | 900 |
| Aw | 0.12 |
| Tg @ Aw = 0.31 | 95° C. |
| Soluble Amylopectin | 18% |

Incorporation by Reference

All of the aforementioned patents, publications, and other references are herein incorporated by reference in their entirety.

What is claimed:

1. A dough comprising:
    (a) from about 35% to about 85% starch-based flour, wherein said starch based flour comprises from about 25% to about 100% potato flakes comprising:
        (1) less than about 70% broken cells; and
        (2) a soluble Amylose to soluble Amylopectin ratio of from about 0.4 to about 4; and
    (b) from about 15% to about 50% added water.

2. The dough of claim 1, wherein said potato flakes comprise less than about 50% broken cells.

3. The dough of claim 2, wherein said potato flakes comprise less than about 40% broken cells.

4. The dough of claim 3, wherein said potato flakes comprise less than about 20% broken cells.

5. The dough of claim 1, 2, 3, or 4, wherein said potato flakes have an Amylose to Amylopectin ratio of from about 1.2 to about 3.

6. A food product made from the dough of claim 5.

7. The food product of claim 6, wherein said food product is selected from the group consisting of mashed potatoes, potato patties, potato pancakes, French fries, potato sticks, breads, gravies, and sauces.

8. The food product of claim 6, wherein said food product is a snack food product.

9. The food product of claim 8, wherein said snack food product is a fabricated chip.

10. A food product made from dough of claim 1, 2, 3, or 4.

11. The food product of claim 10, wherein said food product is selected from the group consisting of mashed potatoes, potato patties, potato pancakes, French fries, potato sticks, breads, gravies, and sauces.

12. The food product of claim 10, wherein said food product is a snack food product.

13. The snack food product of claim 12, wherein said snack food product is a fabricated chip.

14. The dough of claim 1, 2, 3 or 4, having a sheet strength of from about 80 gf to about 450 gf.

15. The dough of claim 14, having a sheet strength of from about 100 gf to about 240 gf.

16. A starch-based potato dough having a Tg of from about −15° C. to about 15° C. (at 30% moisture).

17. The starch-based dough of claim 16, having a Tg of from about −5° C. to about 10° C.

18. The starch-based dough of claim 17, having a Tg of from about 0° C. to about 10° C.

* * * * *